US012552737B2

(12) United States Patent
Morris et al.

(10) Patent No.: US 12,552,737 B2
(45) Date of Patent: Feb. 17, 2026

(54) SALTS OF (2R, 6R)-HYDROXYNORKETAMINE, THEIR CRYSTAL FORMS, AND METHODS OF MAKING THE SAME

(71) Applicants: THE UNITED STATES OF AMERICA, AS REPRESENTED BY THE SECRETARY, DEPARTMENT OF HEALTH AND HUMAN SERVICES, Bethesda, MD (US); THE UNIVERSITY OF MARYLAND, BALTIMORE, Baltimore, MD (US)

(72) Inventors: Patrick Joseph Morris, Gaithersburg, MD (US); Craig Joseph Thomas, Laurel, MD (US); Stephen J. Byard, Morpeth (GB); Martin P. Wilmshurst, Alnwick (GB); Todd Gould, Elkridge, MD (US); Carlos Zarate, Germantown, MD (US); Ruin Moaddel, Bel Air, MD (US)

(73) Assignees: THE UNITED STATES OF AMERICA, AS REPRESENTED BY THE SECRETARY, DEPARTMENT OF HEALTH AND HUMAN SERVICES, Bethesda, MD (US); THE UNVIERSITY OF MARYLAND, BALTIMORE, Baltimore, MD (US); THE UNITED STATES GOVERNMENT AS REPRESENTED BY THE DEPARTMENT OF VETERANS AFFAIRS, Washington, DC (US)

( * ) Notice: Subject to any disclaimer, the term of this patent is extended or adjusted under 35 U.S.C. 154(b) by 877 days.

(21) Appl. No.: 17/777,654

(22) PCT Filed: Nov. 17, 2020

(86) PCT No.: PCT/US2020/060848
§ 371 (c)(1),
(2) Date: May 18, 2022

(87) PCT Pub. No.: WO2021/101867
PCT Pub. Date: May 27, 2021

(65) Prior Publication Data
US 2023/0022767 A1  Jan. 26, 2023

Related U.S. Application Data

(60) Provisional application No. 62/936,823, filed on Nov. 18, 2019.

(51) Int. Cl.
*C07C 225/20* (2006.01)

(52) U.S. Cl.
CPC ........ *C07C 225/20* (2013.01); *C07B 2200/13* (2013.01); *C07C 2601/14* (2017.05)

(58) Field of Classification Search
CPC .......................... C07C 225/20; C07B 2200/13
See application file for complete search history.

(56) References Cited

U.S. PATENT DOCUMENTS 10,919,842 B2 * 2/2021 Thomas ................ C07C 225/20
2005/0191614 A1 9/2005 Cima et al.

FOREIGN PATENT DOCUMENTS

| WO | 2013056229 A1 | 4/2013 |
| WO | 2018102488 A1 | 6/2018 |
| WO | 2019025792 A1 | 2/2019 |
| WO | 2019058145 A1 | 3/2019 |

OTHER PUBLICATIONS

International Search Report issued in Application No. PCT/US2020/060848 on Feb. 17, 2021, 9 pages.
Written Opinion issued in Application No. PCT/US2020/060848 on Feb. 17, 2021, 12 pages.
Berge, S. et al.; "Pharmaceutical Salts"; J Pharm Sci, Am Pharm Assoc, Vol. 66, Issue No. 1; 19 pages (1977).
Byrn, S. et al.; "Pharmaceutical Solids: A Strategic Approach to Regulatory Considerations"; Pharmaceutical Research, Vol. 12, Issue No. 7; pp. 945-954 (1995).
Kawaguchi, Y. et al.; "Drug and Crystal Polymorphism"; Journal of Human Life Engineering, vol. 4, Issue No. 2; pp. 310-317 (2002).
Notification No. 568; Pharmaceutical Safety Bureau; May 1, 2001; 46 pages (2001).
Office Action cited in Japan Application No. 2022-528974; Date of Mailing: Apr. 22, 2025, 2 pages.
Oshima, H.; "Crystallization of Polymorphs and Pseudo-Polymorphs and Its Control"; Pharm Stage, vol. 6, Issue No. 10; pp. 48-53 (2007).
Takada, N.; "API Form Screening and Selection in Drug Discovery Stage"; Pharm Stage, vol. 6, Issue No. 10; pp. 20-25 (2007).
Yamano, M.; "Approach to Crystal Polymorph in Process Research of New Drug"; Journal of Synthetic Organic Chemistry, vol. 64, Issue No. 9; pp. 907-913 (2007).

* cited by examiner

*Primary Examiner* — Sikarl A Witherspoon
(74) *Attorney, Agent, or Firm* — CANTOR COLBURN LLP

(57) ABSTRACT

The disclosure provides salts of (2R,6R)-hydroxynorketamine (HNK), wherein the salt is with an organic acid chosen from malonic acid, salicylic acid, ethane sulfonic acid, glycolic acid, stearic acid, or capric acid, and their crystal forms.

14 Claims, 10 Drawing Sheets

SALTS OF (2R, 6R)-HYDROXYNORKETAMINE, THEIR CRYSTAL FORMS, AND METHODS OF MAKING THE SAME

CROSS-REFERENCE TO RELATED APPLICATIONS

This application is a U.S. National Stage Application of PCT/US2020/060848 filed Nov. 17, 2020, which claims priority to U.S. provisional application Ser. No. 62/936,823, filed Nov. 18, 2019, the contents of which are hereby incorporated by reference in their entirety for all purposes.

STATEMENT OF GOVERNMENT SUPPORT

This invention was made with government support under Grant Number MH107615 awarded by the National Institutes of Health. The United States Government has certain rights in this invention.

BACKGROUND

Ketamine, a drug currently used in human anesthesia and veterinary medicine, has been shown in clinical studies to be effective in the treatment of several conditions, including pain, treatment-resistant bipolar depression, major depressive disorder, and other depression and anxiety-related disorders.

However, the routine use of the drug is hindered by unwanted central nervous system (CNS) effects. Approximately 30% of patients do not respond to ketamine treatment. Additionally, ketamine treatment is associated with serious side effects due to the drug's anesthetic properties and abuse potential.

Ketamine analogs have potential advantages over standard antidepressants, as the time to efficacy of ketamine is rapid and takes effect within hours or minutes, unlike the standard of care selective serotonin reuptake inhibitors (SSRIs) which require several weeks to have an effect. Further, there are patients who respond to the antidepressant effects of ketamine but do not respond to SSRIs.

The compound (2R,6R)-hydroxynorketamine (HNK) is an analog of ketamine which may be useful for treatment of pain, depression, anxiety, and related disorders. Thus, the need for practical and efficient methods of synthesis of these compounds, and for stable polymorphs with good pharmaceutical properties exists. The present disclosure fulfills this need and provides additional advantages set forth herein.

FIELD OF THE DISCLOSURE

This disclosure provides salt forms of (2R,6R)-hydroxynorketamine (HNK), and crystal forms of the corresponding salts. The disclosure further provides methods of producing 2R,6R-HNK salts and methods of producing crystal forms of the corresponding salts.

SUMMARY

The disclosure includes an addition salt of (2R,6R)-hydroxynorketamine obtainable by a reaction of the amine with an organic acid that is malonic acid, salicylic acid, ethane sulfonic acid, glycolic acid, stearic acid, or capric acid.

The disclosure includes crystalline forms of an addition salt of (2R,6R)-hydroxynorketamine obtainable by a reaction of the amine with an organic acid that is malonic acid, salicylic acid, ethane sulfonic acid, glycolic acid, stearic acid, or capric acid.

The disclosure includes crystalline forms of (2R,6R)-hydroxynorketamine malonate and (2R,6R)-hydroxynorketamine salicylate.

The disclosure includes a crystalline form of (2R,6R)-hydroxynorketamine malonate exhibiting a XRPD spectrum having peaks at the following values: 9.4, 12.6, and 15.2 degrees 2θ+/−0.2 degrees 2θ.

The disclosure also includes a crystalline form of (2R,6R)-hydroxynorketamine salicylate exhibiting a XRPD spectrum having peaks at the following values: 9.8, 10.2, and 25.5 degrees 2θ+/−0.2 degrees 2θ.

The disclosure also includes a crystalline form of (2R,6R)-hydroxynorketamine malonate that contains no detectable amounts of other hydroxynorketamine or hydroxynorketamine salts crystalline forms as determined by x-ray powder diffraction; and a crystalline form of (2R,6R)-hydroxynorketamine salicylate that contains no detectable amounts of other hydroxynorketamine or hydroxynorketamine salts crystalline forms as determined by x-ray powder diffraction.

Figure 1:
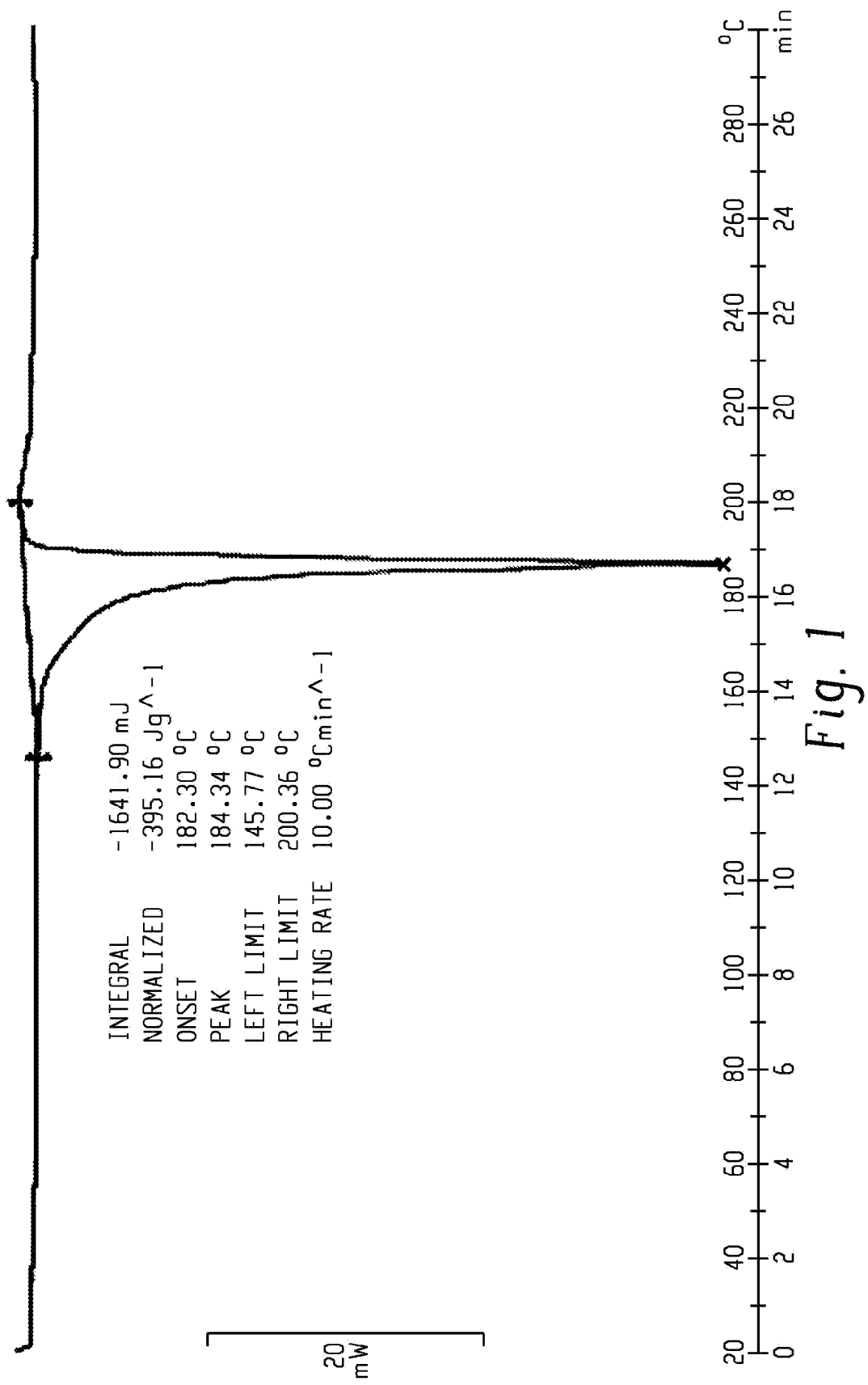
FIG. 1 is a differential scanning calorimetry (DSC) curve of (2R,6R)-hydroxynorketamine malonate.

DETAILED DESCRIPTION (2R,6R)-2-Amino-2-(2-chlorophenyl)-6-hydroxycyclohexanone ((2R,6R)-hydroxynorketamine (HNK)) ketamine has the structure

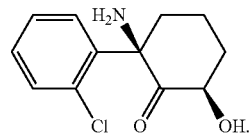

This disclosure provides salt forms of (2R,6R)-hydroxynorketamine ((2R,6R)-HNK) including the addition salts of malonic acid, salicylic acid, ethane sulfonic acid, glycolic acid, stearic acid, or capric acid, and the crystalline forms of (2R,6R)-HNK addition salts of malonic acid, salicylic acid, ethane sulfonic acid, glycolic acid, stearic acid, or capric acid.

Terminology

Compounds disclosed herein are described using standard nomenclature. Unless defined otherwise, all technical and scientific terms used herein have the same meaning as is commonly understood by one of skill in the art to which this disclosure belongs.

The terms "a" and "an" do not denote a limitation of quantity, but rather denote the presence of at least one of the referenced item. The term "or" means "and/or". The terms "comprising", "having", "including", and "containing" are to be construed as open-ended terms (i.e., meaning "including, but not limited to"). Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and independently combinable. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein. Unless defined otherwise, technical and scientific terms used herein have the same meaning as is commonly understood by one of skill in the art to which this invention belongs.

A "patient" means any human or non-human animal in need of medical treatment. Medical treatment can include treatment of an existing condition, such as a disease or disorder, prophylactic or preventative treatment in patients known to be at risk for experiencing symptoms of anxiety or depression, or diagnostic treatment. In some embodiments the patient is a human patient.

"Percent Yield or isolated yield (% yield)" is the weight of the isolated product(s) divided by the molecular weight of the isolated products divided by the moles of starting material used in the reaction.

The transitional phrases "comprising," "consisting essentially of," and "consisting of," carry the means accorded these terms by current patent law. All embodiments claimed with one of the transitional phases may also be claimed using the other transitional phrases. For example, an embodiment claimed with "comprising" as the transitional phrase also include embodiments that may be claimed with "consisting essentially of" or "consisting of" transitional language and vice versa.

Chemical Description

The structure of (2R, 6R)-hydroxynorketamine, IUPAC name (2R,6R)-2-amino-2-(2-chlorophenyl)-6-hydroxycyclohexanone, is:

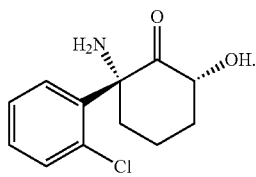 [SMILES: N[C@@]1(c2ccccc2Cl)CCC[C@@H](O)C1=O]

The disclosure provides methods of producing a salt of 2R,6R-HNK in crystalline form and crystalline forms of the corresponding addition salts with malonic acid, salicylic acid, ethane sulfonic acid, glycolic acid, stearic acid, or capric acid.

The disclosure provides a method for the manufacture of a salt of (2R,6R)-hydroxynorketamine by converting the free base to a target salt or by converting a first salt of the amine to a target salt. The method generally involves contacting the (2R,6R)-hydroxynorketamine with an appropriate acid to produce the target salt, optionally further comprising isolating the target salt. In an embodiment the amine is combined with an acid in a solvent or solvent mixture, optionally heated followed by cooling and optional addition of an antisolvent to form a suspension. The salt can be isolated from the suspension by filtration to form a filtrate, and vacuum dried. In certain embodiments the suspension is stirred for about 1 to about 24 hours, or about 5 to about 12 hours after cooling, or after the addition of the solvent or solvent mixture is complete, or after the addition of the antisolvent is complete. In certain embodiments the filtrate is dried more than 8 hours, more than 12 hours, about 12 about 20 hours or about 16 hours.

The process of converting the first salt of the amine to a target salt can involve converting the first salt to the free base using a base, such as potassium carbonate, lithium carbonate, sodium carbonate, or sodium bicarbonate, lithium hydroxide, sodium hydroxide, potassium hydroxide, trimethylamine, trimethylamine, diisopropylethylamine, 1,5-diazabicyclo[4.3.0]non-5-ene (DBN), or 1,8-diazabicyclo[5.4.0]undec-7-ene (DBU). In an embodiment, an alkali hydroxide base such as sodium hydroxide can be used. In an embodiment, a carbonate base such as sodium bicarbonate can be used. The resulting free base can then be treated with the acid of the target salt to produce the salt of (2R,6R)-hydroxynorketamine. In an embodiment, the first salt is the hydrochloric acid salt and the target salt can be a malonate salt, a salicylate salt, an ethane sulfonate salt (an esylate salt), a glycolate salt, a stearate salt, or a caprate salt (a decanoate salt).

Other acids can be used to make other salts of (2R,6R)-hydroxynorketamine.

In an embodiment, a malonate salt is manufactured, and the method additionally includes treating (2R,6R)-hydroxynorketamine with malonic acid to manufacture (2R,6R)-hydroxynorketamine malonate salt.

In an embodiment, a malonate salt is manufactured, and the method additionally includes treating (2R,6R)-hydroxynorketamine with salicylic acid to manufacture (2R,6R)-hydroxynorketamine salicylate salt.

In an embodiment, a malonate salt, a salicylate salt, an ethane sulfonate salt (an esylate salt), a glycolate salt, a stearate salt, or a caprate salt (a decanoate salt) is manufactured. In an embodiment, a crystalline form of a malonate salt, a salicylate salt, an ethane sulfonate salt (an esylate salt), a glycolate salt, a stearate salt, or a caprate salt (a decanoate salt) is manufactured.

In an embodiment, the addition salt is the salt of (2R,6R)-hydroxynorketamine and malonic acid. Provided is a crystalline form of (2R,6R)-hydroxynorketamine malonate exhibiting excellent crystallization properties, reasonably high melting point, high enthalpy of fusion, very low hygroscopicity and minimal hygroscopicity over a range of relative humidities.

Disclosed is a crystalline (2R,6R)-hydroxynorketamine malonate salt exhibiting a XRPD spectrum having peaks at the following values: 9.4, 12.6, and 15.2 degrees 2θ+/−0.2 degrees 2θ. The XRPD spectrum can have one, two, or three further peaks of the following values: 18.7, 21.6, and 25.7 degrees 2θ+/−0.2 degrees 2θ.

In an embodiment, the crystalline (2R,6R)-hydroxynorketamine malonate salt contains no detectable amounts of other hydroxynorketamine or hydroxynorketamine salt crystalline forms as determined by x-ray powder diffraction.

The (2R,6R)-hydroxynorketamine malonate salt can exhibit a XRPD spectrum having one, two, three, four, five, six, or seven further peaks of the following values: 13.8, 14.4, 18.7, 21.6, 22.7, 23.5, and 25.7 degrees 2θ+/−0.2 degrees 2θ.

The (2R,6R)-hydroxynorketamine malonate salt can exhibit a XRPD spectrum having peaks of any combination of at least 3, at least 5, at least 8, or at least 10 of the following values: 9.4, 12.6, 13.8, 14.4, 15.2, 17.2, 17.7, 18.7, 20.2, 20.7, 21.6, 22.7, 23.5, 24.1, 25.7, and 29.4 degrees 2θ+/−0.2 degrees 2θ.

Figure 3:
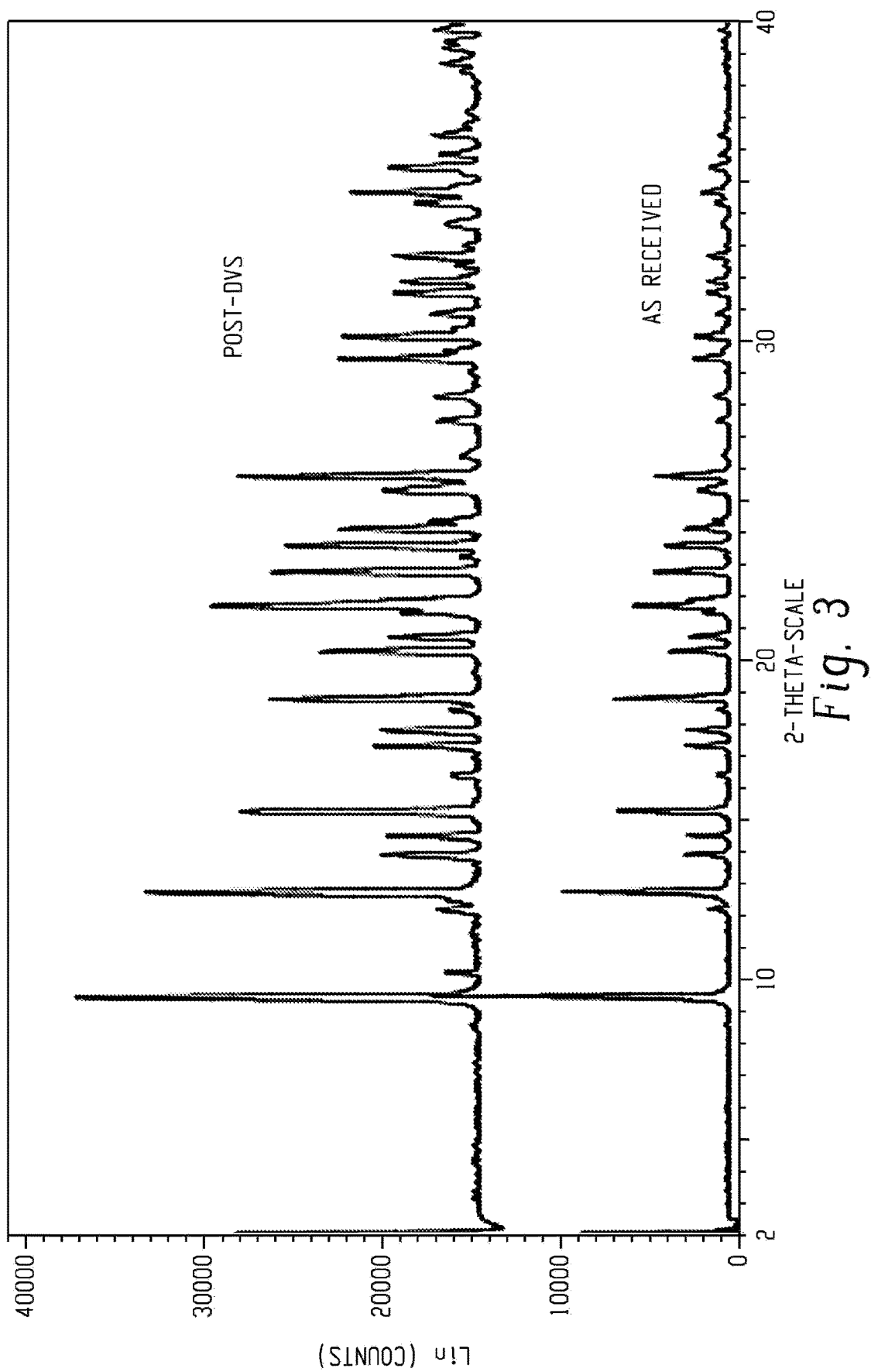
FIG. 3 is a x-ray powder diffraction (XRPD) spectrum of (2R,6R)-hydroxynorketamine malonate.

The (2R,6R)-hydroxynorketamine malonate salt can exhibit a XRPD substantially as shown in FIG. 3.

The disclosure provides a method for the manufacture of (2R,6R)-hydroxynorketamine malonate by combining the free base (2R,6R)-hydroxynorketamine with malonic acid and optionally isolating the (2R,6R)-hydroxynorketamine malonate. In an embodiment, the method comprises combining about 1.0 to about 1.3 equivalents of malonic acid with about 1.0 equivalent of the free base (2R,6R)-hydroxynorketamine in an appropriate volume of solvent, (e.g., ethanol) and the mixture stirred at about room temperature followed by the addition of an antisolvent (e.g. hexane) and stirring continued until a solid is formed. The solid can be recovered and dried using techniques known in the art. Within this embodiment, the volume of ethanol can be about 4.8 to about 5.3 and the volume of hexane can be about 5 to about 8.

In an embodiment, the addition salt is the salt of (2R,6R)-hydroxynorketamine and salicylic acid. Provided is a crystalline form of (2R,6R)-hydroxynorketamine salicylate exhibiting excellent crystallization properties, reasonably high melting point, high enthalpy of fusion, very low hygroscopicity and minimal hygroscopicity over a range of relative humidities.

Disclosed is a crystalline (2R,6R)-hydroxynorketamine salicylate salt exhibiting a XRPD spectrum having peaks at the following values: 9.8, 10.2, and 25.5 degrees 2θ+/−0.2 degrees 2θ. The XRPD spectrum can have one, two, or three further peaks of the following values: 16.1, 16.7, and 20.3 degrees 2θ+/−0.2 degrees 2θ.

In an embodiment, the crystalline (2R,6R)-hydroxynorketamine salicylate salt contains no detectable amounts of other hydroxynorketamine or hydroxynorketamine salt crystalline forms as determined by x-ray powder diffraction.

The (2R,6R)-hydroxynorketamine salicylate salt can exhibit a XRPD spectrum having one, two, three, four, five, six, or seven peaks of the following values: 9.8, 10.2, 16.1, 16.7, 20.3, 22.1, and 25.5 degrees 2θ+/−0.2 degrees 2θ.

The (2R,6R)-hydroxynorketamine salicylate salt can exhibit a XRPD spectrum having peaks of any combination of at least 3, at least 5, at least 8, or at least 10 of the following values: 9.8, 10.2, 13.4, 13.7, 16.1, 16.7, 19.6, 19.8, 20.3, 22.1, 22.8, and 25.5 degrees 2θ+/−0.2 degrees 2θ.

Figure 6:
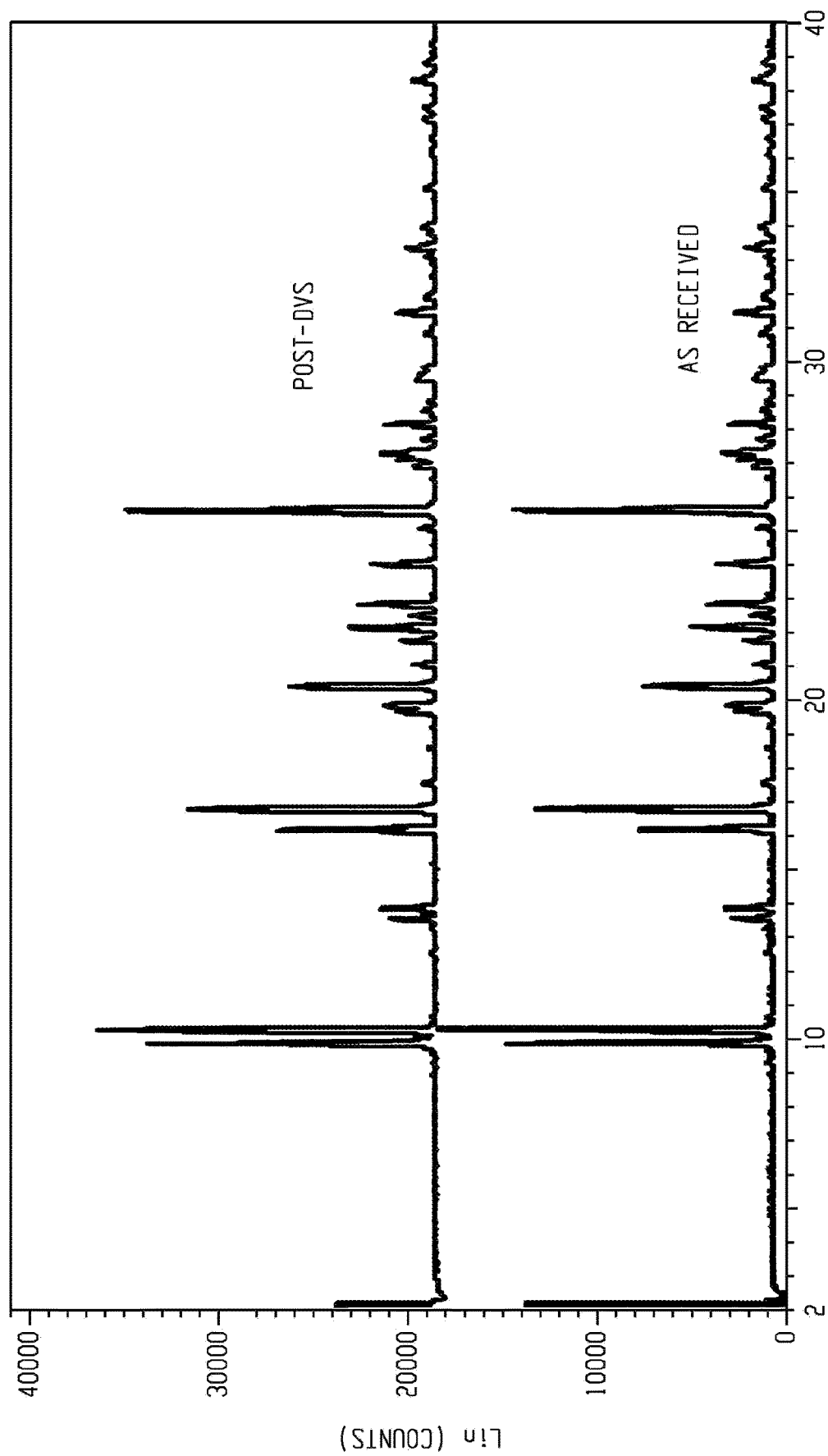
FIG. 6 is a XRPD spectrum of (2R,6R)-hydroxynorketamine salicylate.

The (2R,6R)-hydroxynorketamine salicylate salt can exhibit a XRPD substantially as shown in FIG. 6.

The disclosure provides a method for the manufacture of (2R,6R)-hydroxynorketamine salicylate by combining the free base (2R,6R)-hydroxynorketamine with salicylic acid and optionally isolating the (2R,6R)-hydroxynorketamine salicylate. In an embodiment, the method comprises combining about 1.0 to about 1.3 equivalents of salicylic acid with about 1.0 equivalent of the free base (2R,6R)-hydroxynorketamine in an appropriate volume of solvent, (e.g., ethanol) and the mixture is heated to a temperature of about 50° C. to about 70° C. for about 20 to about 40 minutes, cooled to about room temperature followed by the addition of an antisolvent (e.g. hexane) and stirring continued until a solid is formed. The solid can be recovered and dried using techniques known in the art. Within this embodiment, the volume of ethanol can be about 8 to about 14 and the volume of hexane can be about 10 to about 16.

In an embodiment, the addition salt is the salt of (2R,6R)-hydroxynorketamine and ethane sulfonic acid.

Disclosed is a crystalline (2R,6R)-hydroxynorketamine ethane sulfonate salt exhibiting a XRPD spectrum having peaks at the following values: 6.0, 14.9, and 16.5 degrees 2θ+/−0.2 degrees 2θ. The XRPD spectrum can have one, two, three, or four further peaks of the following values: 11.8, 18.3, 24.2, and 25.3 degrees 2θ+/−0.2 degrees 2θ.

In an embodiment, the crystalline (2R,6R)-hydroxynorketamine ethane sulfonate salt contains no detectable amounts of other hydroxynorketamine or hydroxynorketamine salt crystalline forms as determined by x-ray powder diffraction.

The (2R,6R)-hydroxynorketamine ethane sulfonate salt can exhibit a XRPD spectrum having one, two, three, four, five, six, or seven peaks of the following values: 6.0, 11.8, 14.9, 16.5, 18.3, 24.2, and 25.3 degrees 2θ+/−0.2 degrees 2θ.

The (2R,6R)-hydroxynorketamine ethane sulfonate salt can exhibit a XRPD spectrum having peaks of any combination of at least 3, at least 5, at least 8, or at least 10 of the following values: 6.0, 7.1, 9.2, 10.6, 11.5, 11.8, 12.7, 13.7, 14.1, 14.9, 15.8, 16.5, 18.3, 20.4, 22.3, 23.0, 24.2, 24.8, and 25.3 degrees 2θ+/−0.2 degrees 2θ.

Figure 7:
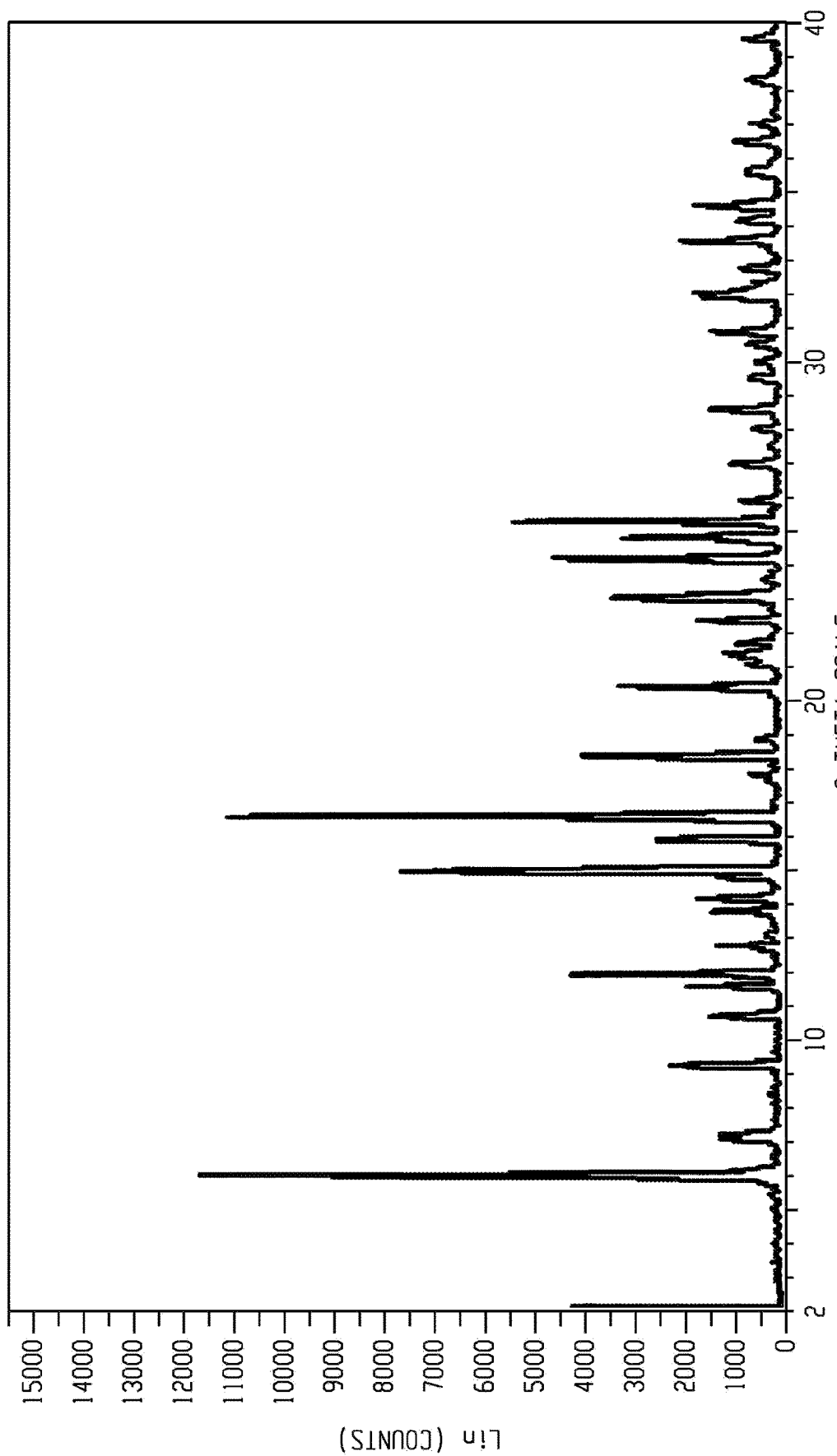
FIG. 7 is a XRPD spectrum of (2R,6R)-hydroxynorketamine ethane sulfonate.

The (2R,6R)-hydroxynorketamine ethane sulfonate salt can exhibit a XRPD substantially as shown in FIG. 7.

In an embodiment, the addition salt is the salt of (2R,6R)-hydroxynorketamine and glycolic acid.

Disclosed is a crystalline (2R,6R)-hydroxynorketamine glycolate salt exhibiting a XRPD spectrum having peaks at the following values: 7.3 and 8.3 degrees 2θ+/−0.2 degrees 2θ. The XRPD spectrum can have one or two further peaks of the following values: 14.7 and 16.6 degrees 2θ+/−0.2 degrees 2θ.

In an embodiment, the crystalline (2R,6R)-hydroxynorketamine glycolate salt contains no detectable amounts of other hydroxynorketamine or hydroxynorketamine salt crystalline forms as determined by x-ray powder diffraction.

The (2R,6R)-hydroxynorketamine glycolate salt can exhibit a XRPD spectrum having one, two, three, four, or five peaks of the following values: 7.3, 8.3, 14.7, 16.6, and 22.1 degrees 2θ+/−0.2 degrees 2θ.

Figure 8:
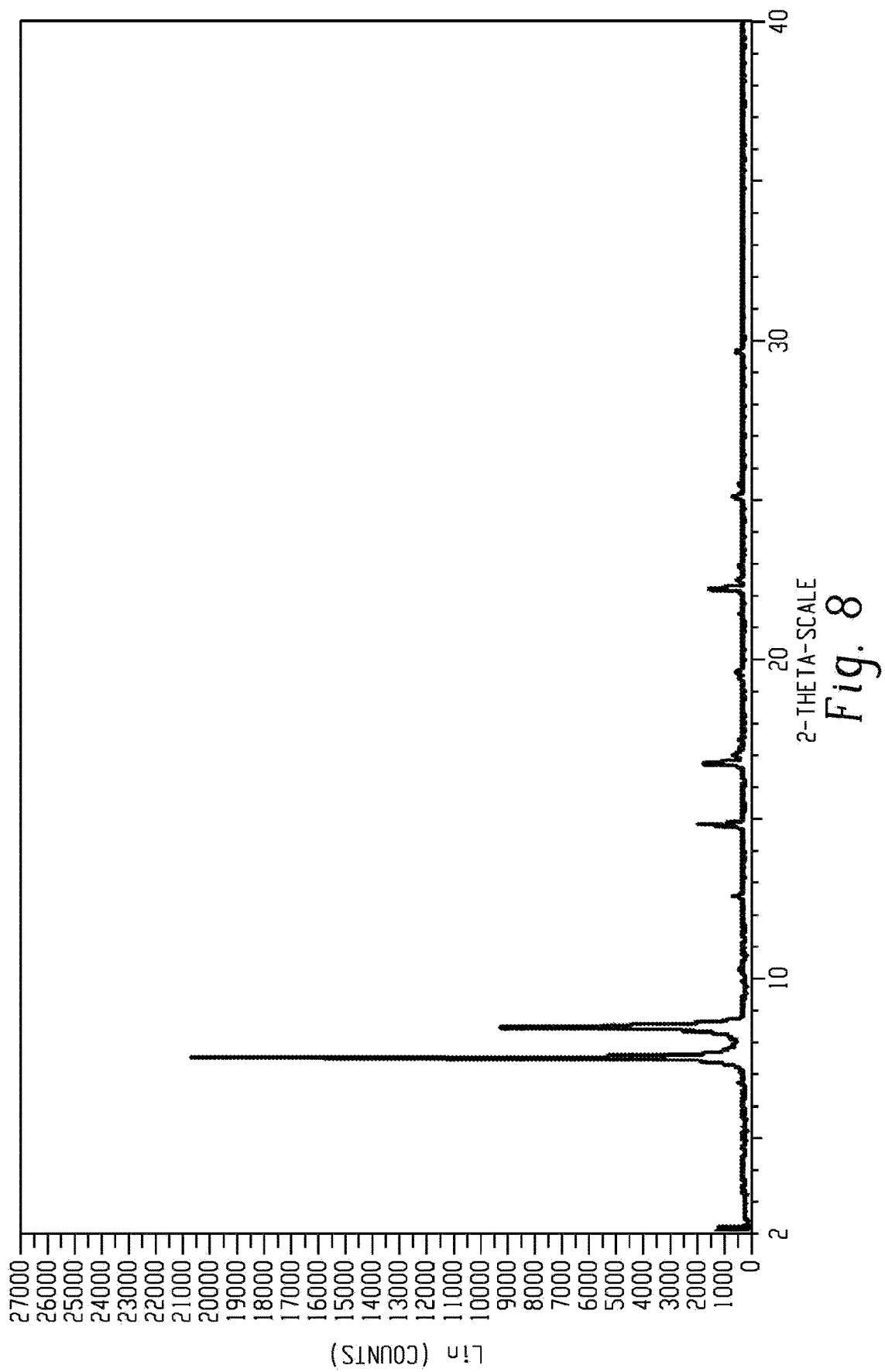
FIG. 8 is a XRPD spectrum of (2R,6R)-hydroxynorketamine glycolate.

The (2R,6R)-hydroxynorketamine glycolate salt can exhibit a XRPD substantially as shown in FIG. 8.

In an embodiment, the addition salt is the salt of (2R,6R)-hydroxynorketamine and stearic acid.

Disclosed is a crystalline (2R,6R)-hydroxynorketamine stearate salt exhibiting a XRPD spectrum having peaks at the following values: 6.1, 6.7, and 10.2 degrees 2θ+/−0.2 degrees 2θ. The XRPD spectrum can have one, two, or three further peaks of the following values: 11.2, 14.2, and 37.0 degrees 2θ+/−0.2 degrees 2θ.

In an embodiment, the crystalline (2R,6R)-hydroxynorketamine stearate salt contains no detectable amounts of other hydroxynorketamine or hydroxynorketamine salt crystalline forms as determined by x-ray powder diffraction.

The (2R,6R)-hydroxynorketamine stearate salt can exhibit a XRPD spectrum having one, two, three, four, five, six, seven, eight peaks of the following values: 4.1, 4.5, 6.1, 6.7, 10.2, 11.2, 14.2, and 37.0 degrees 2θ+/−0.2 degrees 2θ.

The (2R,6R)-hydroxynorketamine stearate salt can exhibit a XRPD spectrum having peaks of any combination of at least 3, at least 5, at least 8, or at least 10 of the following values: 4.1, 4.5, 6.1, 6.7, 10.2, 11.2, 14.2, 15.6, 18.3, 20.3, 24.4, 28.6, 32.7, and 37.0 degrees 2θ+/−0.2 degrees 2θ.

Figure 9:
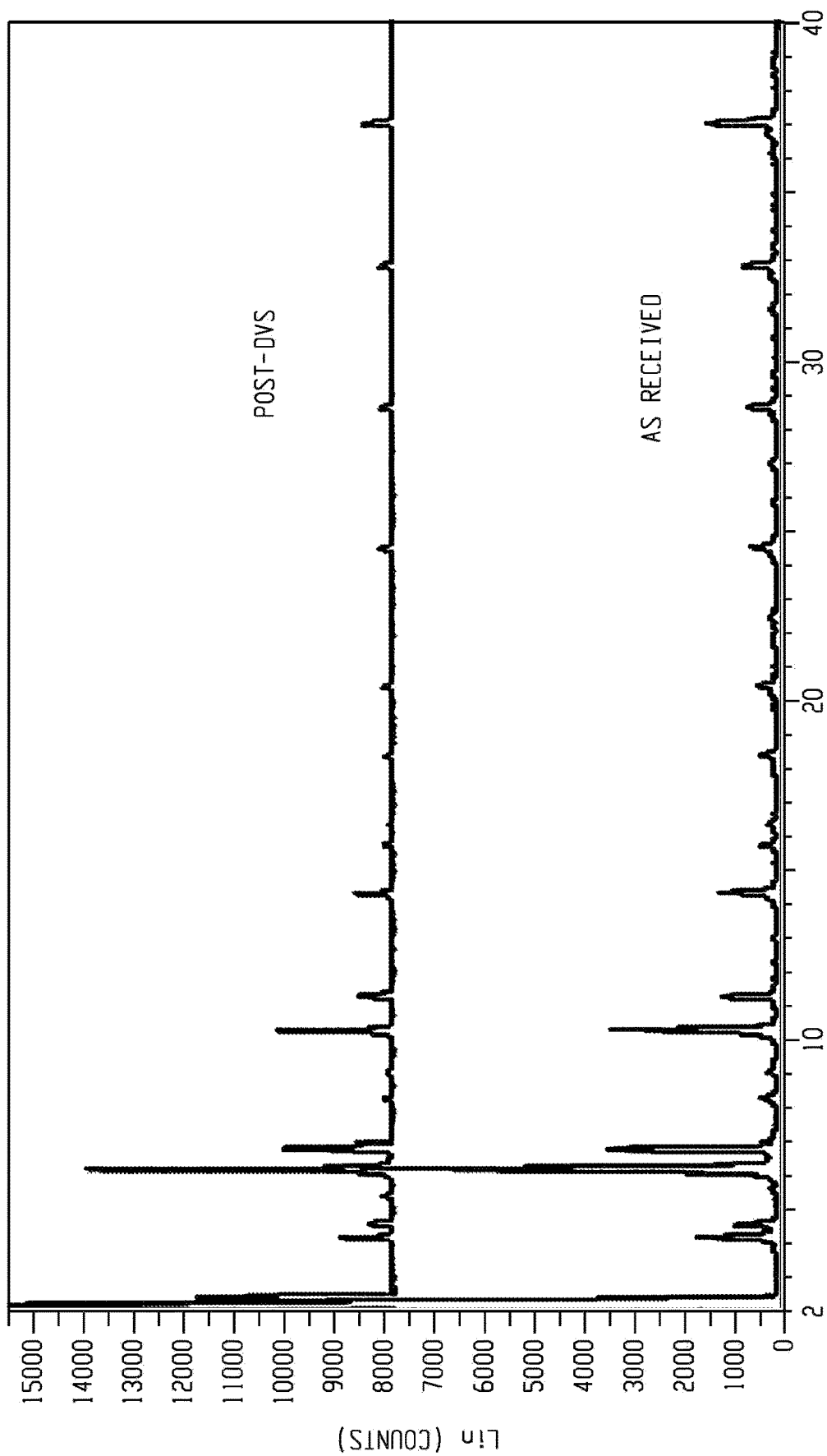
FIG. 9 is a XRPD spectrum of (2R,6R)-hydroxynorketamine stearate.

The (2R,6R)-hydroxynorketamine stearate salt can exhibit a XRPD substantially as shown in FIG. 9.

In an embodiment, the addition salt is the salt of (2R,6R)-hydroxynorketamine and capric acid (decanoic acid).

Disclosed is a crystalline (2R,6R)-hydroxynorketamine caprate salt exhibiting a XRPD spectrum having peaks at the following values: 3.0 and 3.9 degrees 2θ+/−0.2 degrees 2θ. The XRPD spectrum can have one or two further peaks of the following values: 8.9 and 11.6 degrees 2θ+/−0.2 degrees 2θ.

In an embodiment, the crystalline (2R,6R)-hydroxynorketamine caprate salt contains no detectable amounts of other hydroxynorketamine or hydroxynorketamine salt crystalline forms as determined by x-ray powder diffraction.

The (2R,6R)-hydroxynorketamine caprate salt can exhibit a XRPD spectrum having one, two, three four, or five peaks of the following values: 3.0, 3.9, 8.9, 11.6, and 21.6 degrees 2θ+/−0.2 degrees 2θ.

The (2R,6R)-hydroxynorketamine caprate salt can exhibit a XRPD spectrum having peaks of any combination of at least 3, at least 5, at least 8, or at least 10 of the following values: 3.0, 3.9, 8.9, 11.6, 14.3, 14.8, 17.8, 19.3, 21.1, 21.6, 23.8, and 28.2 degrees 2θ+/−0.2 degrees 2θ.

Figure 10:
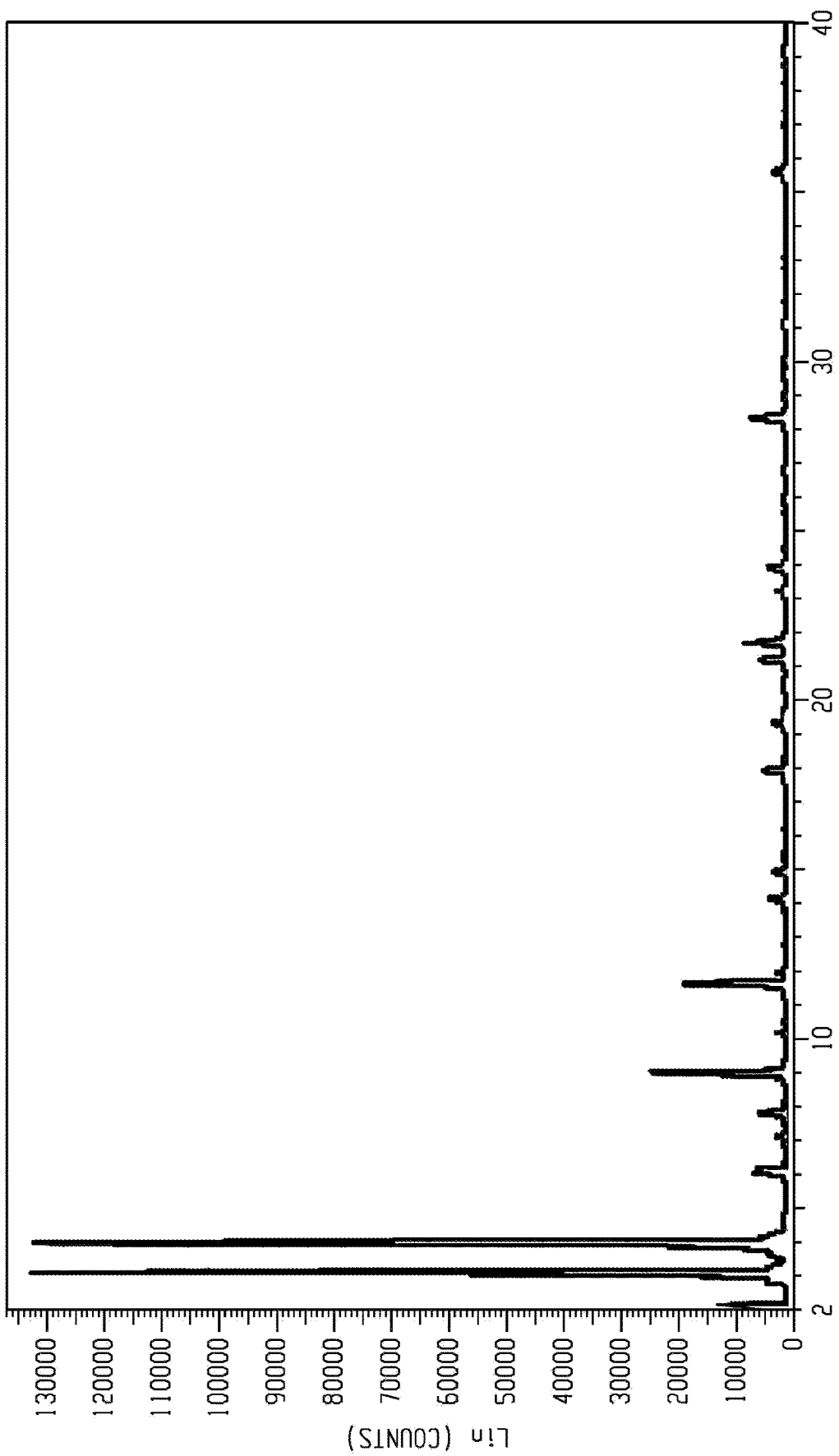
FIG. 10 is a XRPD spectrum of (2R,6R)-hydroxynorketamine caprate.

The (2R,6R)-hydroxynorketamine caprate salt can exhibit a XRPD substantially as shown in FIG. 10.

Pharmaceutical Compositions

The compounds disclosed herein can be administered as the neat chemical, but are preferably administered as a pharmaceutical composition. Accordingly, the disclosure provides pharmaceutical compositions comprising a salt of (2R,6R)-HNK together with at least one pharmaceutically acceptable carrier; the salt of (2R,6R)-HNK may be in crystalline form. Exemplary salts include the malonate, salicylate, ethane sulfonate, glycolate, stearate, or caprate of (2R,6R)-HNK, including the crystalline forms of the (2R,6R)-HNK salts. The pharmaceutical composition may contain the salt of (2R,6R)-HNK as the only active agent, but may contain one or more additional active agents. In certain embodiments the pharmaceutical composition is an oral dosage form, specifically a solid oral dosage form, that contains from about 1 mg to about 5000 mg, from about 10 mg to about 1000 mg, or from about 50 mg to about 500 mg of an active agent which is a salt of (2R,6R)-hydroxynorketamine, or a combination thereof, and optionally from about 0.1 mg to about 2000 mg, from about 10 mg to about 1000 mg, from about 100 mg to about 800 mg, or from about 200 mg to about 600 mg of an additional active agent in a unit dosage form.

Compounds disclosed herein may be administered orally, topically, parenterally, by inhalation or nasal spray, sublingually, transdermally, via buccal administration, rectally, as an ophthalmic solution, or by other means, in dosage unit formulations containing conventional pharmaceutically acceptable carriers. The pharmaceutical composition may be formulated as any pharmaceutically useful form, e.g., as an aerosol, a cream, a gel, a pill, a capsule, a tablet, a syrup, a transdermal patch, or an ophthalmic solution. Some dosage forms, such as tablets and capsules, are subdivided into suitably sized unit doses containing appropriate quantities of the active components, e.g., an effective amount to achieve the desired purpose.

Carriers include excipients and diluents and must be of sufficiently high purity and sufficiently low toxicity to render them suitable for administration to the patient being treated. The carrier can be inert or it can possess pharmaceutical benefits of its own. The amount of carrier employed in conjunction with the compound is sufficient to provide a practical quantity of material for administration per unit dose of the compound.

Classes of carriers include, but are not limited to binders, buffering agents, coloring agents, diluents, disintegrants, emulsifiers, flavorants, glidents, lubricants, preservatives, stabilizers, surfactants, tableting agents, and wetting agents. Some carriers may be listed in more than one class, for example vegetable oil may be used as a lubricant in some formulations and a diluent in others. Exemplary pharmaceutically acceptable carriers include sugars, starches, celluloses, powdered tragacanth, malt, gelatin; talc, and vegetable oils. Optional active agents may be included in a pharmaceutical composition, which do not substantially interfere with the activity of the compound of the present invention.

The pharmaceutical compositions can be formulated for oral administration. Exemplary oral dosage forms are formulated for once a day or twice a day administration. These compositions can contain between 0.1 and 99 weight % (wt. %) of a salt of (2R,6R)-HNK, specifically a crystalline salt of (2R,6R)-HNK. Some embodiments contain from about 25 wt. % to about 50 wt. % or from about 5 wt. % to about 75 wt. % of a salt of (2R,6R)-HNK, specifically a crystalline salt of (2R,6R)-HNK.

Methods of Treatment

Methods of treatment include providing certain dosage amounts of a salt of (2R,6R)-HNK to a patient. Dosage levels of each active agent of about 0.1 mg to about 140 mg per kilogram of body weight per day are useful in the treatment of the above-indicated conditions (about 0.5 mg to about 7 g per patient per day). The amount of active ingredient that may be combined with the carrier materials to produce a single unit dosage form will vary depending upon the patient treated and the particular mode of administration.

In certain embodiments a therapeutically effect amount of the salt is an amount that provide a plasma $C_{max}$ of (2R,6R)-HNK of about of 0.25 mcg/mL to about 125 mcg/mL, or about 1 mcg/mL to about 50 mcg/mL. The disclosure also includes intravenous pharmaceutical compositions that provide about 0.2 mg to about 500 mg per dose of a salt of (2R,6R)-HNK, or for peripheral indications compounds that provide about 0.5 mg to about 500 mg/dose.

Methods of treatment include combination methods in which the salt of (2R,6R)-HNK is administered together with an additional active agent or another therapy. Combination administration includes simultaneous administration, concurrent administration, and sequential administration where the order of administration of the additional active agent or other therapy may be before or after administration of the HNK salt.

Methods of treatment include methods in which the salt of (2R,6R)-HNK is administered in conjunction with psychotherapy, cognitive behavioral therapy, exposure therapy, systematic desensitization, mindfulness, dialectical behavior therapy, interpersonal therapy, eye movement desensitization and reprocessing, social rhythm therapy, acceptance and commitment therapy, family-focused therapy, psychodynamic therapy, light therapy, computer therapy, cognitive remediation, exercise, or other types of therapy.

Methods of treatment include methods in which the salt of (2R,6R)-HNK is administered in conjunction with the use of Electroconvulsive therapy, transcranial magnetic stimulation, deep brain stimulation, use of neuromodulation devices, or other neuromodulatory therapy.

The salt of (2R,6R)-HNK may be the only active agent administered or may be administered together with an additional active agent. For example the HNK active agent may administered together with another active agent that is chosen from any of the following CNS active agents: d-cycloserine, dextromethorphan, escitalopram, fluoxetine, paroxetine, duloxetine, sertraline, citalopram, bupropion, venlafaxine, duloxetine, naltrexone, mirtazapine, venlafaxine, atomoxetine, bupropion, doxepin, amitriptyline, clomipramine, nortriptyline, vortioxetine, vilazadone, milnacipran, levomilacipran, pramipexole, buspirone, lithium, thyroid or other type of hormones (e.g., estrogen, progesterone, testosterone), aripiprazole, brexpiprazole, cariprazine, clozapine, loxapine, lurasidone, olanzapine, paliperidone, quetiapine, risperidone, ziprasidone, carbamazepine, oxcarbazepine, gabapentin, lamotrigine, phenytoin, pregabalin, donepezil, galantamine, memantine, minocycline, rivastigmine, riluzole, tramiprosate, ketamine, or pharmaceutically active salts or prodrugs thereof, or a combination of the foregoing.

The preceding list of additional active agents is meant to be exemplary rather than fully inclusive. Additional active agents not included in the above list may be administered in combination with the salt of (2R,6R)-HNK. The additional active agent will be dosed according to its approved prescribing information, though in some embodiments the additional active agent will be dosed at less the typically prescribed dose and in some instances less than the minimum approved dose.

The disclosure includes a method of treating depressive disorders where an effective amount of the compound is an amount effective to decrease depressive symptoms, wherein a decrease in depressive symptoms is the achievement of a 50% or greater reduction of symptoms identified on a depression symptom rating scale, or a score less than or equal to 7 on the $HRSD_{17}$, or less than or equal to 5 on the $QID-SR_{16}$, or less than or equal to 10 on the MADRS. Likewise the disclosure also provides a method of treating anxiety disorders, anhedonia, fatigue, and suicidal ideation comprising administering and effective amount of a compound of the disclosure, wherein an effective amount of the compound is an amount sufficient to decrease anxiety disorder symptoms, or an amount sufficient to effect an clinically significant decrease of the anxiety disorder, anhedonia, or suicidal ideation symptoms on a symptom rating scale for anxiety, anhedonia, fatigue, or suicidal ideation.

EXAMPLES

General Methods
Chemical Methods

All commercially available reagents and solvents were purchased and used without further purification.

(2R,6R)-Hydroxynorketamine and its hydrochloride salt are previously described in U.S. Patent Application Publications 2014/0296241 and 2019/0135732.

Differential Scanning Calorimetry (DSC)

All DSC curves were acquired using a Mettler Toledo 823 calorimeter, interfaced with a TA8000 workstation operating Mettler Toledo Stare software version 9.01. Typical analysis conditions are listed below.

Start temperature: 20° C.
Heating rate: 10° C.·min$^{-1}$
End temperature: 320° C.
Purge gas: Nitrogen at 70 mL·min$^{-1}$
Sample pan: 40 µL Aluminum pan with punctured lid Typically, 2-7 mg of the sample were packed into an aluminum sample pan. The instrument was calibrated using traceable standards of indium, water and cyclohexane with respect to temperature and heat flow, prior to making any measurements.

X-Ray Powder Diffraction (XRPD)

X-ray powder diffractograms were acquired using a Bruker D5000 diffractometer in Bragg-Brentano configuration. Extended acquisition parameters were employed for each batch of the drug substance, as detailed below.

Acquisition parameters:
Source: CuKα
Wavelength: 1.5406 Å
Scan range: 2-40° (2θ)
Step size: 0.01° (2θ)
Time per step: 4.0 s
Divergence slit width: 2 mm
Antiscatter slit width: 2 mm
Detector slit width: 0.2 mm
Sample rotation: Engaged
Tube accelerating potential: 40 kV
Tube accelerating current: 30 mA
Temperature: Ambient (nominally 18-22° C.)

Approximately 2 mg of each sample was mounted on a silicon base for the analyses.

All the data were smoothed by use of Fourier algorithms and the background was subtracted from each diffractogram. Instrument performance checks were completed prior to measurements using a NIST traceable standard of corundum and also using a standard of Arkansas stone quartz. Table 1 reports the Bragg diffraction angles in degrees two theta (° (2θ)) for the various salts.

Dynamic Vapor Sorption (DVS)

Dynamic vapor sorption-desorption experiments were carried out using a DVS Resolution instrument supplied by Surface Measurement Systems. Data were acquired using the following acquisition parameters:

Solvent: Water
Start relative humidity: 30% RH
Relative humidity cycle (% RH): 30, 40, 50, 60, 70, 80, 90, 95, 90, 80, 70, 60, 50, 40, 30, 20, 10, 0, 10, 20, 30
Equilibrium condition (dm/dt): 0.0002%/minute
Equilibrium condition window: 5 minutes
Minimum stage period: 10 minutes
Maximum stage period: 360 minutes
Temperature: 25° C.
Carrier gas: Nitrogen
Carrier gas flow rate: 100 mL·min$^{-1}$ Typically, 20-50 mg of the test substances were mounted in a gauze basket and transferred to the sample port. Excess static electricity was removed throughout sample handling and sample mounting using a 210Po static eliminator. Instrument performance checks were completed using traceable samples of sodium chloride and lithium chloride.

EXAMPLES

General Overview:

2R,6R-hydroxynorketamine (RR-HNK) (Free base) was utilizes as a starting material for all salt formation. 2R,6R-hydroxynorketamine was synthesized from 2R,6R-hydroxynorketamine hydrochloride by dissolving the HCl salt in water, filtration of the aqueous solution, then using 1.1 eq of 2M aqueous sodium hydroxide to neutralize the hydrochloride salt. The aqueous solution was extracted with dichloromethane three times, the organic extracts combined, and the solvent removed by evaporation to give RR-HNK as the free base.

All weight equivalents in the below experimentals are relative to the RR-HNK free base, where 1 gram RR-HNK equates to 1 gram solvent. Volumes refers to weight/volume equivalents, where 1 gram RR-HNK equates to 1 milliliter solvent. Equivalents are molar equivalents, where 1 millimole RR-HNK equates to 1 millimole acid. All salt formation utilized between 0.7 gram and 1.4 grams of RR-HNK as starting material for the salt formation.

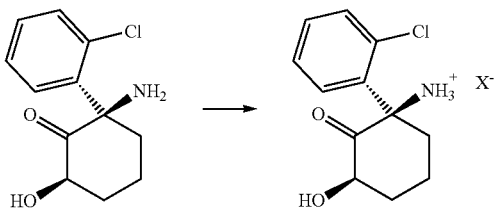

General Method A: Acetate, Methanesulfonate, Sulfate, Phosphate:

General Method A was conducted where 1.2 equivalents of acid was stirred with 1 wt. eq. water and 7 volumes of ethanol. To the resulting mixture was added a solution of 1.0 eq of RR-HNK free base in 4.2 volumes of ethanol. The mixtures were stirred at room temperature, heated to about 60° C. for 30 minutes, cooled, 13 volumes of hexane added, and stirring continued for a minimum of 12 hours.

Example 1. 2R,6R-hydroxynorketamine (RR-HNK) Acetate

RR-HNK acetate was prepared according to General Method A. 1.1 eq more acetic acid was added, the mixture evaporated to an orange oil, triturated with ether and cooled. After standing at room temperature, the solid produced was washed with ether and dried. 95% yield.

Example 2. 2R,6R-hydroxynorketamine (RR-HNK) Sulfate

RR-HNK sulfate was prepared according to General Method A. The solvent was evaporated. After attempts to triturate with ether and ethyl acetate, the residue was dissolved in 3.5 volumes of ethanol at 40° C., stood, cooled, and 2.1 volumes of ethyl acetate was added. To the solution obtained was added isopropanol, then the mixture was evaporated to dryness and re-dissolved in 1.4 volumes of water, filtered, washing the filter through with ~0.7 volumes water. After storing as a solution, a nitrogen flow was applied to evaporate slowly. The initial skin on liquid surface was disturbed to allow evaporation and eventually a large solid lump was present which was mashed and dried. Clusters of crystals formed but mainly oil was present. One clump of crystals were removed into a vial with some surrounding oil and mashed up in acetone to give a fine white solid. More of the crystals/oil were slowly added to this mixture, generating more solid. 0.4 volumes of acetone was added to the residue in the flask, which was agitated for 10 minutes and then stood overnight. More acetone was added until all the oil had dissolved, then both vial and flask contents were filtered to collect the white solid, which was washed with acetone and dried. 16% yield.

Example 3. 2R,6R-hydroxynorketamine (RR-HNK) METHANESULFONATE

RR-HNK methanesulfonate was prepared according to General Method A. The solvent was evaporated and the residue triturated with ether. 2.8 volumes of hexane were added and the solid was collected by filtration. The flask was rinsed out onto the filter with 2×1.4 volumes of 1:1 ethanol:hexane, washing the cake, and the solid dried. 74% yield.

General Method B: Citric Acid Monohydrate, Salicylic Acid.

General Method B was conducted where 1.2 equivalents of acid was stirred with 7 volumes of ethanol. To the resulting mixture was added a solution of 1.0 eq of RR-HNK free base in 4.2 volumes ethanol. The mixtures were stirred at room temperature, heated to about 60° C. for ~30 minutes, cooled, 13 volumes of hexane was added, and stirring continued for a minimum of 12 hours.

Example 4. 2R,6R-hydroxynorketamine (RR-HNK) citrate

RR-HNK citrate monohydrate was prepared according to General Method B. The solvent was removed and ethyl acetate was added. The resulting material was treated with ether, the solvent decanted, and the residue triturated sequentially with acetone, ethyl acetate, then ethanol. After heating to dissolve the oil, standing and addition of ethyl acetate eventually a thick opaque emulsion was obtained which was cooled in dry ice, allowed to warm to ambient then left to stand. The liquid was decanted away and the oil warmed up and cooled. 0.7 volumes of ethanol was added, the mixture was sonicated, stood overnight, mixed, sonicated again, and stood again. 3.5 volumes of ethanol was added and the mixture agitated to form a yellow solution which was decanted away. The gum was mixed thoroughly with 1.4 volumes of ethanol until discrete separate particles formed which were collected by filtration, washed with ethanol and the sticky pale yellow solid dried. 33% yield.

Example 5. 2R,6R-hydroxynorketamine (RR-HNK) Salicylate

RR-HNK salicylate was prepared according to General Method B. The solid was collected by filtration, washed with 2.1 volumes of 1:1 ethanol: hexane, and dried. 84% yield.

Figure 4:
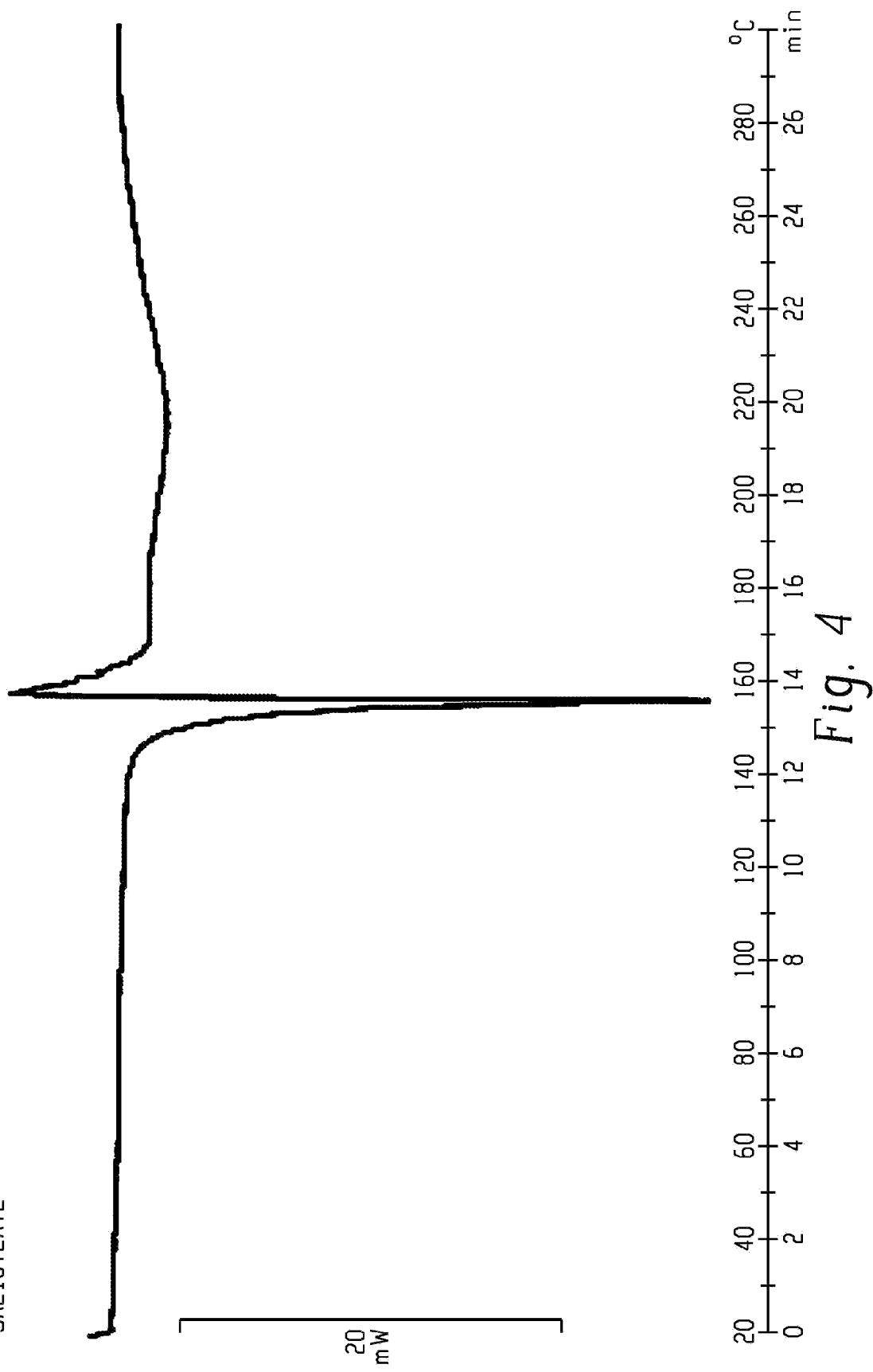
FIG. 4 is a DSC curve of (2R,6R)-hydroxynorketamine salicylate.
Figure 5:
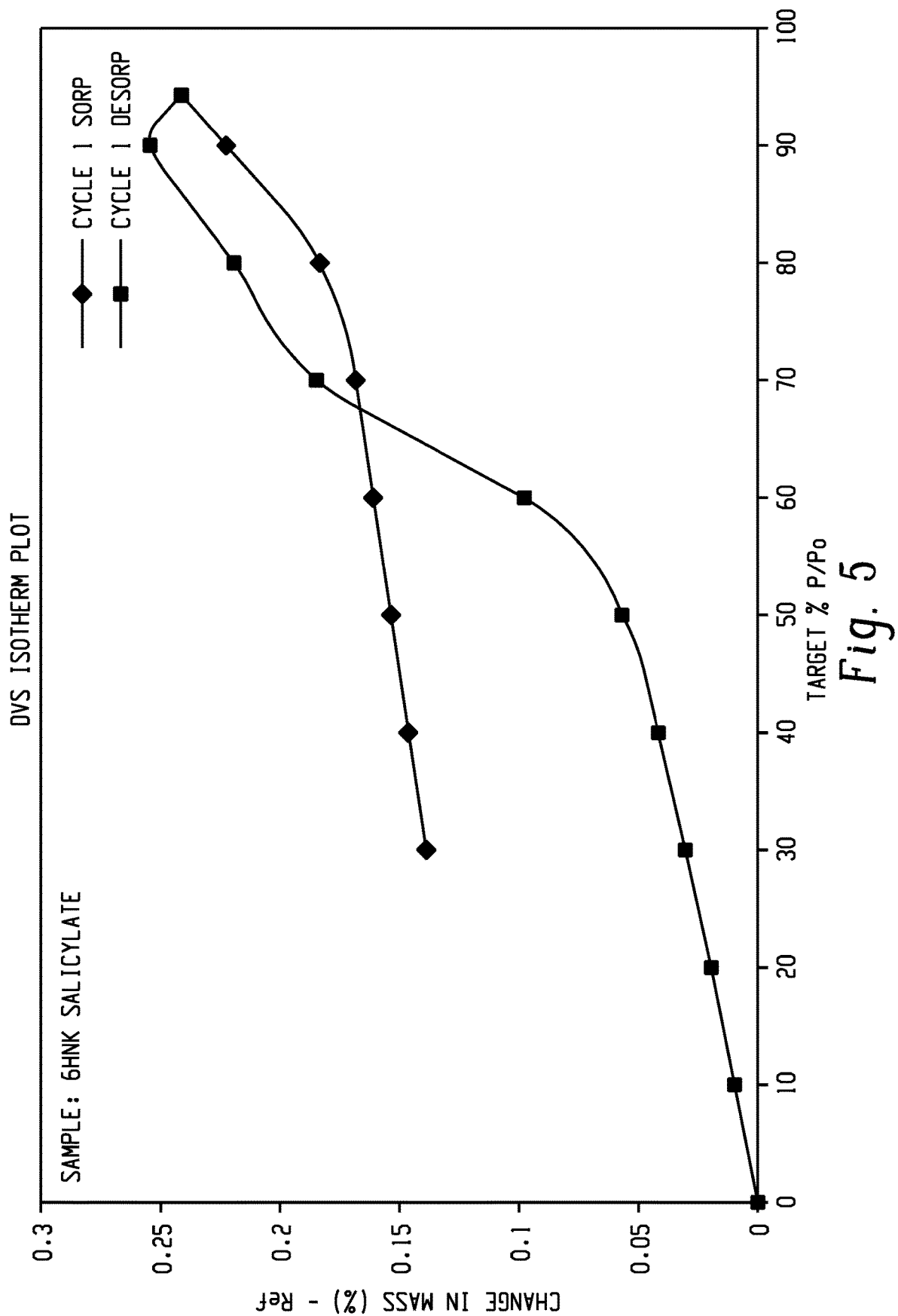
FIG. 5 is a DVS isotherm plot of (2R,6R)-hydroxynorketamine salicylate.

The DSC curve, DVS isotherm profile and X-ray powder diffractograms of (2R,6R) hydroxynorketamine salicylate are shown in FIG. 4, FIG. 5, and FIG. 6, respectively. Crystallization of the salicylate salt was quite favorable, readily yielding a white free-flowing crystalline powder. The DSC curve and X-ray powder diffractograms confirm that the salt is highly crystalline and has a reasonable melting point (>140° C.) and enthalpy of fusion. The DVS isotherm plot shows that the material acquires very little water over the entire range of relative humidities included in the experiment (0% RH to 95% RH) which is quite exceptional.

Also, based on X-ray powder diffraction data, it is evident that exposure to elevated relative humidities does not change the physical form of the salicylate salt form. RR-HNK salicylate is non-hygroscopic.

General Method C: Hydrobromic Acid, Benzenesulfonic Acid, p-Toluenesulfonic Acid, Ethanesulfonic Acid.

General Method C was conducted where 1.03 equivalents of acid was stirred with 1.4 volumes of ethanol. To each of the resulting mixtures was added a solution of 1.0 eq of RR-HNK free base in 2.2 volumes ethanol, washed in with another 0.7 volumes of ethanol. The mixtures were stirred at room temperature, for a minimum of 12 hours.

Example 6. 2R,6R-hydroxynorketamine (RR-HNK) Hydrobromide

RR-HNK hydrobromide salt was prepared according to General Method C. 3.5 volumes of hexane were added, stirring continued for 6 hours, and the mixture allowed to stand. The solid was recovered by filtration, washed with hexane, and dried. 39% yield.

Example 7. 2R,6R-hydroxynorketamine (RR-HNK) Benzenesulfonate

RR-HNK benzenesulfonic acid salt was prepared according to General Method C. 7.2 volumes of hexane were added, stirring continued for 6.5 hours, and the mixture allowed to stand. The solvent was evaporated and the residue triturated with ether. The solid was collected by filtration, washed with ether and dried. 43% yield.

Example 8. 2R,6R-hydroxynorketamine (RR-HNK) P-toluenesulfonate

RR-HNK p-toluenesulfonic acid salt was prepared according to General Method C. 7.2 volumes of hexane were added, stirring continued for 5 hours, and the mixture allowed to stand. The solvent was evaporated and the residue triturated with ether followed by acetonitrile. Most of the oil was decanted away and triturated separately to give more solid. All solids were mashed together and recovered by filtration, using more ether to rinse out the flask, causing more of the oil to crystallize. The solids were combined, recovered, washed again with ether and dried. 73% yield.

Example 9. 2R,6R-hydroxynorketamine (RR-HNK) Ethanesulfonate

RR-HNK ethanesulfonic acid salt was prepared according to General Method C. 7.2 volumes of hexane were added, stirring continued for 6 hours, and the mixture allowed to stand. Ether was added, the solvent evaporated and the residue triturated with acetonitrile. The oil was removed, the solid transferred to a filter, washed with ether and acetonitrile and dried. The filter and flask washings were added to the oil; more solid was obtained which was combined with the previously isolated solid, the solids re-filtered and washed with acetonitrile and dried. 82% yield. FIG. 7 is a XRPD spectrum of (2R,6R)-hydroxynorketamine ethane sulfonate.

Example 10. 2R,6R-hydroxynorketamine (RR-HNK) D-glucuronate 1.0 Equivalents of D-glucuronic acid was stirred with 5.1 volumes of ethanol at 70° C., a solution of 1.0 eq of RR-HNK free base in 4.2 volumes of ethanol was added followed by 0.28 volumes of water. The mixture was stirred until all lumps of solid had dissolved, 13.3 volumes of hexane was added and the mixture allowed to cool with stirring. The solid was collected by filtration, washed with ethanol, and dried. 55% yield.

Example 11. 2R,6R-hydroxynorketamine (RR-HNK) Glycolate 1.2 Equivalents of glycolic acid was stirred with 7 volumes of ethanol and a solution of 1.0 eq of RR-HNK free base in 4.2 volumes of ethanol was added. The mixture was heated to 70° C., 0.56 volumes of water and 13.3 volumes of hexane were added, and allowed to cool. The solvent was evaporated and the residue stood overnight in acetonitrile. The solid was collected by filtration and the flask rinsed out onto the cake with acetonitrile. The solid was washed with acetonitrile and dried. 85% yield. FIG. 8 is a XRPD spectrum of (2R,6R)-hydroxynorketamine glycolate.

Example 12. 2R,6R-hydroxynorketamine (RR-HNK) Caprate 1.05 Equivalents of decanoic acid was heated to ~40° C. with 2.8 volumes of ethanol and a solution of 1.0 eq of RR-HNK free base in 4.2 volumes of ethanol was added, rinsing this in with 0.7 vol of ethanol. After 1 hour, 13.3 volumes of hexane was added and the mixture stirred. The solvent was evaporated and the residue stood overnight. Trituration with acetone gave a very small amount of white solid which was collected by filtration, washed with acetone and dried. The liquors were evaporated to an oil, triturated with hexane, the liquid removed, and the remaining residue triturated with acetone, collected, washed with acetone, combined with the previous solid and dried. 10% yield. FIG. 10 is a XRPD spectrum of (2R,6R)-hydroxynorketamine caprate. Note, an alternate name for this compound is (2R,6R)-hydroxynorketamine decanoate.

Example 13. 2R,6R-hydroxynorketamine (RR-HNK) L-(−) malate 1.05 Equivalents of L-(−) malic acid was heated to ~40° C. with 2.8 volumes of ethanol and a solution of 1.0 eq of RR-HNK free base in 4.2 volumes of ethanol was added, rinsing this in with 0.7 vol of ethanol. 4.9 volumes of hexane were added. A yellow oil separated which solidified, and white crystals grew in the solution. The white crystals were collected by filtration, washed (ethanol) and dried. The solidified oil was crushed to make a white powder, slurried with ethanol, collected by filtration and dried. 49% yield.

Example 14. 2R,6R-hydroxynorketamine (RR-HNK) Adipate 1.05 Equivalents of adipic acid was heated to ~40° C. in ethanol and a solution of 1.0 eq of RR-HNK free base in 4.2 volumes of ethanol was added, rinsing this in with 0.7 vol of ethanol. 14.4 volumes of hexane were added. The solvent was evaporated and trituration of the residue with acetone gave a white solid which was removed. The liquors were evaporated, hexane was added and solvent was decanted away. The residue was stirred with Acetonitrile, the crystals collected by filtration, washed with Acetonitrile and dried. 21% yield.

Example 15. 2R,6R-hydroxynorketamine (RR-HNK) Stearate 1.05 Equivalents of stearic acid was heated to ~40° C. with 13.9 volumes of ethanol and a solution of 1.0 eq of RR-HNK free base in 4.2 volumes of ethanol was added, rinsing this in with 1.3 vol of ethanol. The mixture was allowed to cool overnight. Thin sheets of solid with a waxy appearance were collected by filtration, washed with ethanol and dried. 28% yield. FIG. 9 is a XRPD spectrum of (2R,6R)-hydroxynorketamine stearate.

Example 16. 2R,6R-hydroxynorketamine (RR-HNK) Fumarate 0.82 Equivalents of fumaric acid was heated to ~60° C. with 8 volumes of ethanol, a solution of 1.0 eq of RR-HNK free base in 3.3 volumes of ethanol was added and the mixture cooled to 0° C. 3.8 volumes of heptane was added followed by a further 0.22 equivalents of acid. The mixture was reheated to dissolve, 5.4 volumes of heptane was added, and allowed to cool. The mixture was filtered, washing the solid with 2.2 volumes of heptane, and another 1.6 volumes of heptane was added to the liquors. After stirring for 4 hours, the solvent was decanted away, the residue dried on a rotary evaporator and then triturated with acetonitrile. The solid was broken up, recovered by filtration, washed with acetonitrile and dried. 36% yield.

Example 17. 2R,6R-hydroxynorketamine (RR-HNK) Succinate 1.05 Equivalents of succinic acid was heated to ~60° C. with 8 volumes of ethanol, a solution of 0.7 eq of RR-HNK free base in 3.3 volumes of ethanol was added and the mixture cooled and 5 volumes of heptane added. Approximately 0.3 eq of freshly prepared RR-HNK free base were added using 1.8 volumes of ethanol. Another 7.2 volumes of heptane was added and the mixture stirred. A portion of solvent was removed by evaporation and a further 10.8 volumes of heptane was added. The solvent was decanted away, the residue dried on a rotary evaporator and then triturated with acetonitrile. The solid was recovered by filtration, washed with acetonitrile and dried. 32% yield.

Example 18. 2R,6R-hydroxynorketamine (RR-HNK) Malonate 1.03 Equivalents of malonic acid was stirred with 2.2 volumes of ethanol and a solution of 1.0 eq of RR-HNK free base in 2.2 volumes of ethanol was added, washing in with another 0.7 volumes of ethanol. The mixture was stirred at room temperature for a minimum of 12 h, 7 volumes of hexane was added, and stirring continued until a granular solid formed which was recovered by filtration, washed with hexane, and dried. 91% yield.

Figure 2:
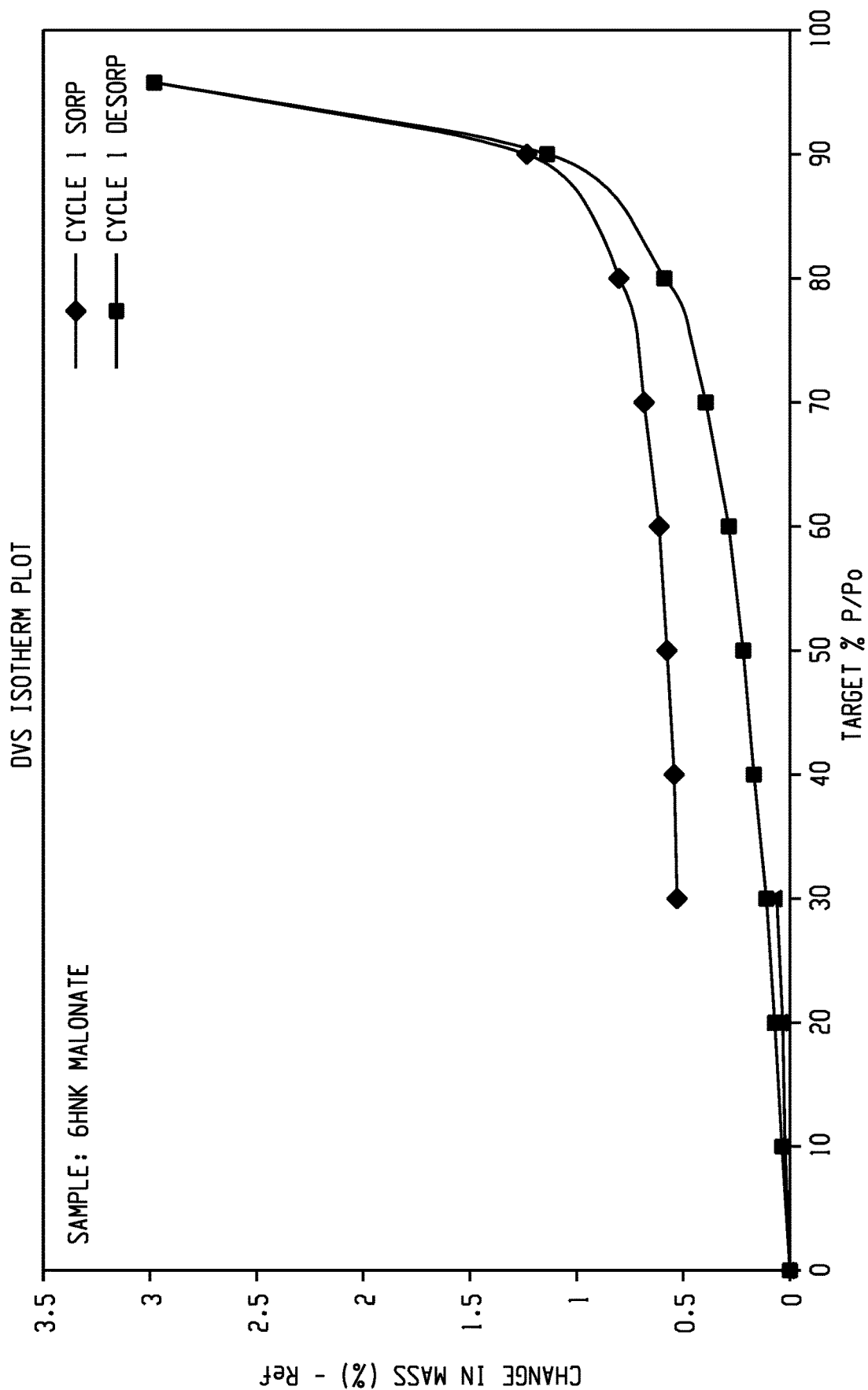
FIG. 2 is a dynamic vapor sorption (DVS) isotherm plot of (2R,6R)-hydroxynorketamine malonate.

The DSC curve, DVS isotherm profile and X-ray powder diffractogram of (2R,6R) hydroxynorketamine malonate are shown in FIG. 1, FIG. 2, and FIG. 3 respectively. Crystallization of the malonate salt was quite straightforward, readily yielding crystalline material. The DSC curve shows a high melting point with good enthalpy of fusion and no low temperature events. X-ray powder diffractograms were acquired before and after the DVS experiment (FIG. 3). RR-HNK malonate is non-hygroscopic.

Example 19. 2R,6R-hydroxynorketamine (RR-HNK) L-Tartrate 1.03 Equivalents of L-tartaric acid was stirred with 2.9 volumes of ethanol at ~50° C. and approximately two-thirds of a solution of 1.0 eq of RR-HNK free base in 2.2 volumes of ethanol was added, causing the mixture to set, resembling a gel. A further 1.4 volumes of ethanol was added, followed by the remaining RR-HNK free base solution, washing in with another 1.4 volumes of ethanol. The mixture was heated to 80° C., adding another 5.8 volumes of ethanol and 2.9 volumes of water. The mixture was cooled and the solid recovered by filtration, washed with ethanol, and dried. 84% yield.

Example 20. 2R,6R-hydroxynorketamine (RR-HNK) D/L-Lactate 1.03 Equivalents of D/L lactic acid was stirred with 0.7 volumes of ethanol and a solution of 1.0 eq of RR-HNK free base in 2.2 volumes of ethanol was added, washing in with another 0.7 volumes of ethanol. Hexane was added slowly until an emulsion began to form then allowed to stand overnight. The solvent was evaporated, the residue dissolved in approximately 1.4 to 2.2 volumes of acetonitrile, and ether added very slowly until the mixture had approximately equal volumes of acetonitrile and ether. The solvent was evaporated and the residue triturated with water. The resulting material was washed with water, isopropanol and ether and dried. 7% yield.

Table 1 reports the Bragg diffraction angles degrees two theta (° (2θ)) for the various crystalline salts produced.

TABLE 1

| Example—salt | Bragg diffraction angles/°(2θ) | | | | | | | | | |
|---|---|---|---|---|---|---|---|---|---|---|
| 2 Sulfate | 6.6 | 13.1 | 16.2 | 18.5 | 19.0 | 21.8 | 23.6 | 26.2 | | |
| 16 Fumarate | 9.2 | 10.2 | 11.0 | 11.8 | 12.5 | 13.7 | 14.8 | 15.3 | 16.5 | 18.9 |
| | 19.2 | 22.1 | 22.6 | 23.0 | 24.7 | 25.0 | 25.8 | 27.1 | | |
| 18 Malonate | 9.4 | 12.6 | 13.8 | 14.4 | 15.2 | 17.2 | 17.7 | 18.7 | 20.2 | 20.7 |
| | 21.6 | 22.7 | 23.5 | 24.1 | 25.7 | 29.4 | | | | |
| 17 Succinate | 6.8 | 10.4 | 11.0 | 11.5 | 12.0 | 13.6 | 14.3 | 15.0 | 15.9 | 17.0 |
| | 17.4 | 19.6 | 20.3 | 20.8 | 21.4 | 22.5 | 23.9 | 25.7 | 27.2 | |
| 4 Citrate | 7.1 | 11.0 | 14.0 | 14.8 | 15.2 | 15.6 | 17.1 | 17.6 | 18.1 | 19.5 |
| | 20.4 | 21.1 | 21.5 | 22.3 | 23.1 | 25.9 | 26.7 | 28.1 | 28.9 | |
| 19 L-Tartrate | 6.4 | 8.1 | 8.8 | 10.3 | 10.7 | 12.8 | 13.7 | 14.1 | 16.3 | 16.8 |
| | 17.6 | 18.8 | 19.6 | 20.8 | 21.4 | 22.0 | 23.3 | 23.6 | 25.7 | |
| 6 Hydrobromide | 7.9 | 12.2 | 13.8 | 15.6 | 16.7 | 17.9 | 18.9 | 20.7 | 22.1 | 23.5 |
| | 23.7 | 24.8 | 26.9 | 27.4 | 28.7 | 30.0 | 31.4 | 32.3 | | |
| 10 Glucuronate | 5.7 | 10.9 | 11.4 | 11.9 | 13.1 | 14.0 | 15.4 | 16.8 | 17.1 | 18.7 |
| | 20.1 | 21.9 | 24.9 | 25.2 | 26.2 | | | | | |
| 5 Salicylate | 9.8 | 10.2 | 13.4 | 13.7 | 16.1 | 16.7 | 19.6 | 19.8 | 20.3 | 22.1 |
| | 22.8 | 25.5 | | | | | | | | |

TABLE 1-continued

| Example—salt | Bragg diffraction angles/°(2θ) | | | | | | | | |
|---|---|---|---|---|---|---|---|---|---|
| 8 Toluenesulfonate | 6.0 | 12. | 17.9 | 21.7 | 24.0 | 25.8 | 30.1 | 36.3 | |
| 7 Benzenesulfonate | 6.2 | 12.4 | 12.7 | 15.5 | 18.1 | 18.6 | 18.9 | 21.0 | 22.4 | 23.4 |
| | 24.4 | 31.2 | | | | | | | |
| 3 Methanesulfonate | 7.5 | 12.0 | 12.5 | 12.9 | 14.9 | 15.9 | 17.6 | 18.9 | 19.3 | 21.8 |
| | 22.4 | 22.7 | 24.3 | | | | | | |
| 9 Ethanesulfonate | 6.0 | 7.1 | 9.2 | 10.6 | 11.5 | 11.8 | 12.7 | 13.7 | 14.1 | 14.9 |
| | 15.8 | 16.5 | 18.3 | 20.4 | 22.3 | 23.0 | 24.2 | 24.8 | 25.3 | |
| 11 Glycolate | 7.3 | 8.3 | 14.7 | 16.6 | 22.1 | | | | | |
| 13 L-(−)-Malate | 6.6 | 8.3 | 10.6 | 11.8 | 12.9 | 13.2 | 14.5 | 17.9 | 18.8 | 19.4 |
| | 20.9 | 21.1 | 21.7 | 22.9 | | | | | | |
| 14 Adipate | 8.4 | 13.1 | 19.0 | 19.5 | 21.6 | 25.9 | 28.3 | 31.3 | | |
| 20 DL-Lactate | 14.0 | 14.9 | 15.3 | 16.6 | 17.6 | 18.2 | 19.5 | 20.5 | 21.1 | 21.5 |
| | 23.1 | 24.0 | 24.4 | 25.9 | 26.7 | 28.1 | 28.9 | 29.6 | | |
| 15 Stearate | 4.1 | 4.5 | 6.1 | 6.7 | 10.2 | 11.2 | 14.2 | 15.6 | 18.3 | 20.3 |
| | 24.4 | 28.6 | 32.4 | 37.0 | | | | | | |
| 12 Caprate | 3.0 | 3.9 | 8.9 | 11.6 | 14.0 | 14.8 | 17.8 | 19.3 | 21.1 | 21.6 |
| | 23.8 | 28.2 | | | | | | | | |

SPECIFIC EMBODIMENTS

Embodiment 1. An addition salt of (2R,6R)-hydroxynorketamine and an organic acid, wherein the organic acid is malonic acid, salicylic acid, ethane sulfonic acid, glycolic acid, stearic acid, or capric acid.

Embodiment 2. The salt of Embodiment 1, that is an addition salt of (2R,6R)-hydroxynorketamine and malonic acid.

Embodiment 3. The salt of Embodiment 2, that is a crystalline addition salt of (2R,6R)-hydroxynorketamine and malonic acid.

Embodiment 4. The salt of Embodiment 3, wherein the crystalline addition salt of (2R,6R)-hydroxynorketamine and malonic acid exhibiting a XRPD spectrum having peaks at the following values: 9.4, 12.6, and 15.2 degrees 2θ+/−0.2 degrees 2θ.

Embodiment 5. The salt of Embodiment 4, wherein the crystalline addition salt of (2R,6R)-hydroxynorketamine and malonic acid exhibiting a XRPD spectrum having one, two, or three further peaks of the following values: 18.7, 21.6, and 25.7 degrees 2θ+/−0.2 degrees 2θ.

Embodiment 6. The salt of Embodiment 4, wherein the crystalline addition salt of (2R,6R)-hydroxynorketamine and malonic acid exhibiting a XRPD spectrum having one, two, three, four, five, six, or seven further peaks of the following values: 13.8, 14.4, 18.7, 21.6, 22.7, 23.5, and 25.7 degrees 2θ+/−0.2 degrees 2θ.

Embodiment 7. The salt of Embodiment 3, wherein the crystalline addition salt of (2R,6R)-hydroxynorketamine and malonic acid exhibiting a XRPD spectrum having peaks of any combination of at least 3, at least 5, at least 8, or at least 10 of the following values: 9.4, 12.6, 13.8, 14.4, 15.2, 17.2, 17.7, 18.7, 20.2, 20.7, 21.6, 22.7, 23.5, 24.1, 25.7, and 29.4 degrees 2θ+/−0.2 degrees 2θ.

Embodiment 8. The salt of Embodiment 3, exhibiting a XRPD spectrum substantially as shown in FIG. 3.

Embodiment 9. The salt of Embodiment 1, that is an addition salt of (2R,6R)-hydroxynorketamine and salicylic acid.

Embodiment 10. The salt of Embodiment 9, that is a crystalline addition salt of (2R,6R)-hydroxynorketamine and salicylic acid.

Embodiment 11. The salt of Embodiment 10, wherein the crystalline addition salt of (2R,6R)-hydroxynorketamine and salicylic acid exhibiting a XRPD spectrum having peaks at the following values: 9.8, 10.2, and 25.5 degrees 2θ+/−0.2 degrees 2θ.

Embodiment 12. The salt of Embodiment 11, wherein the crystalline addition salt of (2R,6R)-hydroxynorketamine and salicylic acid exhibiting a XRPD spectrum having one, two, or three further peaks of the following values: 16.1, 16.7, and 20.3 degrees 2θ+/−0.2 degrees 2θ.

Embodiment 13. The salt of Embodiment 10, wherein the crystalline addition salt of (2R,6R)-hydroxynorketamine and salicylic acid exhibiting a XRPD spectrum having one, two, three, four, five, six, or seven peaks of the following values: 9.8, 10.2, 16.1, 16.7, 20.3, 22.1, and 25.5 degrees 2θ+/−0.2 degrees 2θ.

Embodiment 14. The salt of Embodiment 10, wherein the crystalline addition salt of (2R,6R)-hydroxynorketamine and salicylic acid exhibiting a XRPD spectrum having peaks of any combination of at least 3, at least 5, at least 8, or at least 10 of the following values: 9.8, 10.2, 13.4, 13.7, 16.1, 16.7, 19.6, 19.8, 20.3, 22.1, 22.8, and 25.5 degrees 2θ+/−0.2 degrees 2θ.

Embodiment 15. The salt of Embodiment 10, exhibiting a XRPD spectrum substantially as shown in FIG. 6.

Embodiment 16. The salt of Embodiment 1, wherein the salt is a crystalline form of (2R,6R)-hydroxynorketamine ethane sulfonate exhibiting a XRPD spectrum having peaks at the following values: 6.0, 14.9, and 16.5 degrees 2θ+/−0.2 degrees 2θ, optionally having one, two, three, or four further peaks of the following values: 11.8, 18.3, 24.2, and 25.3 degrees 2θ+/−0.2 degrees 2θ, or a XRPD spectrum having peaks of any combination of at least 3, at least 5, at least 8, or at least 10 of the following values: 6.0, 7.1, 9.2, 10.6, 11.5, 11.8, 12.7, 13.7, 14.1, 14.9, 15.8, 16.5, 18.3, 20.4, 22.3, 23.0, 24.2, 24.8, and 25.3 degrees 2θ+/−0.2 degrees 2θ; a crystalline form of (2R,6R)-hydroxynorketamine glycolate exhibiting a XRPD spectrum having peaks at the following values: 7.3 and 8.3 degrees 2θ+/−0.2 degrees 2θ, optionally having one or two further peaks of the following values: 14.7 and 16.6 degrees 2θ+/−0.2 degrees 2θ, or a XRPD spectrum having one, two, three, four, or five peaks of the following values: 7.3, 8.3, 14.7, 16.6, and 22.1 degrees 2θ+/−0.2 degrees 2θ; a crystalline form of (2R,6R)-hydroxynorketamine stearate exhibiting a XRPD spectrum having peaks at the following values: 6.1, 6.7, and 10.2 degrees 2θ+/−0.2 degrees 2θ, optionally having one, two, or three further peaks of the following values: 11.2, 14.2, and 37.0 degrees 2θ+/−0.2 degrees 2θ, or a XRPD spectrum having peaks of any combination of at least 3, at least 5, at least 8, or at least 10 of the following values: 4.1, 4.5, 6.1, 6.7, 10.2, 11.2, 14.2, 15.6, 18.3, 20.3, 24.4, 28.6, 32.7, and 37.0 degrees 2θ+/−0.2 degrees 2θ; or a crystalline form of (2R,6R)-hydroxynorketamine caprate exhibiting a XRPD spectrum having peaks at the following values: 3.0 and 3.9 degrees 2θ+/−0.2 degrees 2θ, optionally having one or two further peaks of the following values: 8.9 and 11.6 degrees 2θ+/−0.2 degrees 2θ, or a XRPD spectrum having peaks of any combination of at least 3, at least 5, at least 8, or at least 10 of the following values: 3.0, 3.9, 8.9, 11.6, 14.3, 14.8, 17.8, 19.3, 21.1, 21.6, 23.8, and 28.2 degrees 2θ+/−0.2 degrees 2θ.

Embodiment 17. The salt of Embodiment 1, wherein the salt is
- a crystalline form of (2R,6R)-hydroxynorketamine ethane sulfonate exhibiting a XRPD spectrum substantially as shown in FIG. 7;
- a crystalline form of (2R,6R)-hydroxynorketamine glycolate exhibiting a XRPD spectrum substantially as shown in FIG. 8;
- a crystalline form of (2R,6R)-hydroxynorketamine stearate exhibiting a XRPD spectrum substantially as shown in FIG. 9; or
- a crystalline form of (2R,6R)-hydroxynorketamine caprate exhibiting a XRPD spectrum substantially as shown in FIG. 10.

Embodiment 18. The salt of any one of Embodiments 3-8 and 10-17, wherein the crystalline form contains no detectable amounts of other hydroxynorketamine or hydroxynorketamine salts crystalline forms as determined by x-ray powder diffraction.

Embodiment 19. A pharmaceutical composition comprising the salt of any one of Embodiments 1-18 and a pharmaceutically acceptable carrier; specifically wherein the pharmaceutical composition is a solid oral pharmaceutical composition.

Embodiment 20. A method of treating a depressive disorder, an anxiety disorder, Psychotic Depression, Suicidal Ideation, Disruptive Mood Dysregulation Disorder, Persistent Depressive Disorder (Dysthymia), Premenstrual Dysphoric Disorder, Substance/Medication-Induced Depressive Disorder, Depressive Disorder Due to Another Medical Condition, Other Specified Depressive Disorder, Unspecified Depressive Disorder, Separation Anxiety Disorder, Selective Mutism, Specific Phobia, Social Anxiety Disorder (Social Phobia), Panic Disorder, Panic Attack (Specifier), Agoraphobia, Generalized Anxiety Disorder, Substance/Medication-Induced Anxiety Disorder, Anxiety Disorder Due to Another Medical Condition, Other Specified Anxiety Disorder, Anhedonia, Post Traumatic Stress Disorder, Unspecified Anxiety Disorder, or fatigue, wherein the method comprises administering an effective amount of a salt of any one of Embodiments 1-18, or the pharmaceutical composition of Embodiment 19, to a patient in need of such treatment.

The invention claimed is:

1. A crystalline addition salt of (2R,6R)-hydroxynorketamine and an organic acid, wherein the organic acid is malonic acid, salicylic acid, ethane sulfonic acid, glycolic acid, stearic acid, or capric acid,
wherein the crystalline addition salt of (2R,6R)-hydroxynorketamine and malonic acid exhibit a XRPD spectrum having peaks at the following values: 9.4, 12.6, and 15.2 degrees 2θ+/−0.2 degrees 2θ; and
wherein the crystalline addition salt of (2R,6R)-hydroxynorketamine and salicylic acid exhibits a XRPD spectrum having peaks at the following values: 9.8, 10.2, and 25.5 degrees 2θ+/−0.2 degrees 2θ.

2. The crystalline addition salt of claim 1, wherein the crystalline addition salt of (2R,6R)-hydroxynorketamine and malonic acid exhibits a XRPD spectrum having one, two, or three further peaks of the following values: 18.7, 21.6, and 25.7 degrees 2θ+/−0.2 degrees 2θ.

3. The crystalline addition salt of claim 1, wherein the crystalline addition salt of (2R,6R)-hydroxynorketamine and malonic acid exhibits a XRPD spectrum having one, two, three, four, five, six, or seven further peaks of the following values: 13.8, 14.4, 18.7, 21.6, 22.7, 23.5, and 25.7 degrees 2θ+/−0.2 degrees 2θ.

4. The crystalline addition salt of claim 1, wherein the crystalline addition salt of (2R,6R)-hydroxynorketamine and malonic acid exhibits a XRPD spectrum having peaks of any combination of at least 3, at least 5, at least 8, or at least 10 of the following values: 9.4, 12.6, 13.8, 14.4, 15.2, 17.2, 17.7, 18.7, 20.2, 20.7, 21.6, 22.7, 23.5, 24.1, 25.7, and 29.4 degrees 2θ+/−0.2 degrees 2θ.

5. The crystalline addition salt of claim 1, exhibiting a XRPD spectrum substantially as shown in FIG. 3.

6. The crystalline addition salt of claim 1, wherein the crystalline addition salt of (2R,6R)-hydroxynorketamine and salicylic acid exhibits a XRPD spectrum having one, two, or three further peaks of the following values: 16.1, 16.7, and 20.3 degrees 2θ+/−0.2 degrees 2θ.

7. The crystalline addition salt of claim 1, wherein the crystalline addition salt of (2R,6R)-hydroxynorketamine and salicylic acid exhibits a XRPD spectrum having one, two, three, four, five, six, or seven peaks of the following values: 9.8, 10.2, 16.1, 16.7, 20.3, 22.1, and 25.5 degrees 2θ+/−0.2 degrees 2θ.

8. The crystalline addition salt of claim 1, wherein the crystalline addition salt of (2R,6R)-hydroxynorketamine and salicylic acid exhibits a XRPD spectrum having peaks of any combination of at least 3, at least 5, at least 8, or at least 10 of the following values: 9.8, 10.2, 13.4, 13.7, 16.1, 16.7, 19.6, 19.8, 20.3, 22.1, 22.8, and 25.5 degrees 2θ+/−0.2 degrees 2θ.

9. The crystalline addition salt of claim 1, exhibiting a XRPD spectrum substantially as shown in FIG. 6.

10. The crystalline addition salt of claim 1, wherein the salt is
- a crystalline form of (2R,6R)-hydroxynorketamine ethane sulfonate exhibiting a XRPD spectrum having peaks at the following values: 6.0, 14.9, and 16.5 degrees 2θ+/−0.2 degrees 2θ, optionally having one, two, three, or four further peaks of the following values: 11.8, 18.3, 24.2, and 25.3 degrees 2θ+/−0.2 degrees 2θ, or a XRPD spectrum having peaks of any combination of at least 3, at least 5, at least 8, or at least 10 of the following values: 6.0, 7.1, 9.2, 10.6, 11.5, 11.8, 12.7, 13.7, 14.1, 14.9, 15.8, 16.5, 18.3, 20.4, 22.3, 23.0, 24.2, 24.8, and 25.3 degrees 2θ+/−0.2 degrees 2θ;
- a crystalline form of (2R,6R)-hydroxynorketamine glycolate exhibiting a XRPD spectrum having peaks at the following values: 7.3 and 8.3 degrees 2θ+/−0.2 degrees 2θ, optionally having one or two further peaks of the following values: 14.7 and 16.6 degrees 2θ+/−0.2 degrees 2θ, or a XRPD spectrum having one, two, three, four, or five peaks of the following values: 7.3, 8.3, 14.7, 16.6, and 22.1 degrees 2θ+/−0.2 degrees 2θ;
- a crystalline form of (2R,6R)-hydroxynorketamine stearate exhibiting a XRPD spectrum having peaks at the following values: 6.1, 6.7, and 10.2 degrees 2θ+/−0.2 degrees 2θ, optionally having one, two, or three further peaks of the following values: 11.2, 14.2, and 37.0 degrees 2θ+/−0.2 degrees 2θ, or a XRPD spectrum having peaks of any combination of at least 3, at least 5, at least 8, or at least 10 of the following values: 4.1, 4.5, 6.1, 6.7, 10.2, 11.2, 14.2, 15.6, 18.3, 20.3, 24.4, 28.6, 32.7, and 37.0 degrees 2θ+/−0.2 degrees 2θ; or a crystalline form of (2R,6R)-hydroxynorketamine caprate exhibiting a XRPD spectrum having peaks at the following values: 3.0 and 3.9 degrees 2θ+/−0.2 degrees 2θ, optionally having one or two further peaks of the following values: 8.9 and 11.6 degrees 2θ+/−0.2 degrees 2θ, or a XRPD spectrum having peaks of any combination of at least 3, at least 5, at least 8, or at least 10 of the following values: 3.0, 3.9, 8.9, 11.6, 14.3, 14.8, 17.8, 19.3, 21.1, 21.6, 23.8, and 28.2 degrees 2θ+/−0.2 degrees 2θ.

11. The crystalline addition salt of claim 1, wherein the salt is a crystalline form of (2R,6R)-hydroxynorketamine ethane sulfonate exhibiting a XRPD spectrum substantially as shown in FIG. 7;

a crystalline form of (2R,6R)-hydroxynorketamine glycolate exhibiting a XRPD spectrum substantially as shown in FIG. 8;

a crystalline form of (2R,6R)-hydroxynorketamine stearate exhibiting a XRPD spectrum substantially as shown in FIG. 9; or a crystalline form of (2R,6R)-hydroxynorketamine caprate exhibiting a XRPD spectrum substantially as shown in FIG. 10.

12. The crystalline addition salt of claim 1, wherein the crystalline form contains no detectable amounts of other hydroxynorketamine or hydroxynorketamine salts crystalline forms as determined by x-ray powder diffraction.

13. A pharmaceutical composition comprising the crystalline addition salt of claim 1 and a pharmaceutically acceptable carrier; specifically wherein the pharmaceutical composition is a solid oral pharmaceutical composition.

14. A method of treating a depressive disorder, an anxiety disorder, Psychotic Depression, Suicidal Ideation, Disruptive Mood Dysregulation Disorder, Persistent Depressive Disorder (Dysthymia), Premenstrual Dysphoric Disorder, Substance/Medication-Induced Depressive Disorder, Depressive Disorder Due to Another Medical Condition, Other Specified Depressive Disorder, Unspecified Depressive Disorder, Separation Anxiety Disorder, Selective Mutism, Specific Phobia, Social Anxiety Disorder (Social Phobia), Panic Disorder, Panic Attack (Specifier), Agoraphobia, Generalized Anxiety Disorder, Substance/Medication-Induced Anxiety Disorder, Anxiety Disorder Due to Another Medical Condition, Other Specified Anxiety Disorder, Anhedonia, Post Traumatic Stress Disorder, Unspecified Anxiety Disorder, or fatigue, wherein the method comprises administering an effective amount of the crystalline addition salt of claim 1 to a patient in need of such treatment.

* * * * *